US006233575B1

(12) United States Patent
Agrawal et al.

(10) Patent No.: US 6,233,575 B1
(45) Date of Patent: May 15, 2001

(54) MULTILEVEL TAXONOMY BASED ON FEATURES DERIVED FROM TRAINING DOCUMENTS CLASSIFICATION USING FISHER VALUES AS DISCRIMINATION VALUES

(75) Inventors: Rakesh Agrawal; Soumen Chakrabarti, both of San Jose; Byron Edward Dom, Los Gatos; Prabhakar Raghavan, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/102,861

(22) Filed: Jun. 23, 1998

Related U.S. Application Data

(60) Provisional application No. 60/050,611, filed on Jun. 24, 1997.

(51) Int. Cl.⁷ ................................................... G06F 17/30
(52) U.S. Cl. ..................................... 707/6; 707/2; 706/12
(58) Field of Search ........................ 707/1–10, 100–104, 707/200–206, 500–503, 511–516, 531–536, 907; 706/12–21, 25–28, 45–55, 60–61, 934; 382/156–157

(56) References Cited

U.S. PATENT DOCUMENTS

| | | | |
|---|---|---|---|
| 4,975,975 | 12/1990 | Filipski | 382/227 |
| 5,168,565 | 12/1992 | Morita | 707/3 |
| 5,317,507 | 5/1994 | Gallant | 707/532 |
| 5,325,298 | 6/1994 | Gallant | 704/9 |
| 5,418,946 | 5/1995 | Mori | 707/1 |

(List continued on next page.)

FOREIGN PATENT DOCUMENTS 0 744 702 A1   11/1996   (EP) ......................... 17/30

OTHER PUBLICATIONS

Ho, T.K. et al., decision combination in multiple classifier systems, IEEE transactions on pattern analysis and machine intelligence, vol. 16, No. 1, pp 66–75, Jan. 1994.*

Soumen Chakrabarti et al., Enhanced hypertext categorization using hyperlinks, proceedings of ACM SIGMOD international conference on Management of data, and 307–318, Jun. 1998.*

Yuwono, B et al., search and ranking algorithms for locating resources on world wide web, proceedings of the 12th international conference, pp 164–171, Mar. 1996.*

Hill, P. et al., "Multiple Views of Product Information", *IBM Technical Disclosure Bulletin*, vol. 39, No. 02, pp. 17–24 (Feb. 1996).

(List continued on next page.)

*Primary Examiner*—John Breene
*Assistant Examiner*—Srirama Channavajjala
(74) *Attorney, Agent, or Firm*—Gates & Cooper LLP

(57) ABSTRACT

A system, process, and article of manufacture for organizing a large text database into a hierarchy of topics and for maintaining this organization as documents are added and deleted and as the topic hierarchy changes. Given sample documents belonging to various nodes in the topic hierarchy, the tokens (terms, phrases, dates, or other usable feature in the document) that are most useful at each internal decision node for the purpose of routing new documents to the children of that node are automatically detected. Using feature terms, statistical models are constructed for each topic node. The models are used in an estimation technique to assign topic paths to new unlabeled documents. The hierarchical technique, in which feature terms can be very different at different nodes, leads to an efficient context-sensitive classification technique. The hierarchical technique can handle millions of documents and tens of thousands of topics. A resulting taxonomy and path enhanced retrieval system (TAPER) is used to generate context-dependent document indexing terms. The topic paths are used, in addition to keywords, for better focused searching and browsing of the text database.

32 Claims, 7 Drawing Sheets

U.S. PATENT DOCUMENTS

| | | | |
|---|---|---|---|
| 5,428,778 | 6/1995 | Brookes | 707/5 |
| 5,469,354 | 11/1995 | Hatakeyama et al. | 707/3 |
| 5,506,984 | 4/1996 | Miller | 707/10 |
| 5,519,857 | 5/1996 | Kato et al. | 707/5 |
| 5,535,382 * | 7/1996 | Ogawa | 707/5 |
| 5,557,794 | 9/1996 | Matsunaga et al. | 707/3 |
| 5,568,640 | 10/1996 | Nishiyama et al. | 707/1 |
| 5,576,954 | 11/1996 | Driscoll | 707/3 |
| 5,600,827 | 2/1997 | Nakabayashi et al. | 707/2 |
| 5,625,767 * | 4/1997 | Bartell et al. | 345/440 |
| 5,659,724 | 8/1997 | Borgida et al. | 707/3 |
| 5,675,710 * | 10/1997 | Lewis | 706/12 |
| 5,826,260 * | 10/1998 | Byrd, Jr. et al. | 707/5 |
| 5,838,816 * | 11/1998 | Holmberg | 382/157 |
| 5,918,240 * | 6/1999 | Kupiec et al. | 707/531 |

OTHER PUBLICATIONS

Rus, D. et al., "Using Non–Textual Cues for Electronic Document Browsing", *Digital Libraries Workshop DL '94, Newark, NJ, USA, May 19–20, 1994 Selected Papers*, Chapter 9, pp. 129–162.

Koller, D. et al., "Hierarchically Classifying Documents Using Very Few Words", *The Fourteenth International Conference on Machine Learning*, pp. 170–178 (Jul. 1997).

Mladenic D., "Feature Subset Selection in Text–Learning", *10$^{th}$ European Conference on Machine Learning*, pp. 95–100, (1998).

Yang, Y. et al., "A Comparative Study on Feature Selection in Text Categorization", *International Conference on Machine Learning*, pp. 412–420 (Jul. 1997).

Apte, C. et al., "Automated Learning of Decision Rules for Text Categorization", *IBM Research Report RC 18879*. To Appear in ACM Transactions on Information Systems, pp. 1–20 (no date).; vol. 12, Issue 3, accepted Mar. 1994.

Schutze, H. et al., "A Comparison of Classifiers and Document Representations for the Routing Problem", *Proceedings of the 18$^{th}$ Annual International ACM SIGIR Conference on Research and Development in Information Retrieval*, pp. 229–237 (Jul. 1995).

Lewis, D., "Evaluating Text Categorization", *Proceedings of the Speech and Natural Language Workshop, Asilomar*, pp. 312–318 (Feb. 1991).

Lewis, D., "Feature Selection and Feature Extraction for Text Categorization", *Speech and Natural Language: Proceedings of a Workshop Held at Harriman, New York* pp. 212–217 (Feb. 1992).

Koller, D., "Toward Optimal Feature Selection", *In Lorenza Saitta, ed., Machine Learning: Proc. Of the Thirteenth International Conference*, Morgan Kaufmann, 9 pages, (1996).

Panyr, J., "STEINADLER—a system of automatic description and classification of documents", *Nachr. Dok*, vol. 29, No. 4–5, pp. 184–191 (Sep. 1978) (Abstract in English). Abstract in English Only Considered.

* cited by examiner

MULTILEVEL TAXONOMY BASED ON FEATURES DERIVED FROM TRAINING DOCUMENTS CLASSIFICATION USING FISHER VALUES AS DISCRIMINATION VALUES

PROVISIONAL APPLICATION

The present application claims the benefit of U.S. Provisional Application Ser. No. 60/050,611, entitled "USING TAXONOMY, DISCRIMINANTS, AND SIGNATURES FOR NAVIGATING IN TEXT DATABASES", filed Jun. 24, 1997, by Rakesh Agrawal, et al., which is incorporated herein by reference, in its entirety.

BACKGROUND OF THE INVENTION

1. Field of the Invention

The present invention relates, generally, to a process, system and article of manufacture for organizing and indexing information items such as documents by topic, and in preferred embodiments, to such a process, system and article which employ a topic hierarchy and involve a determination of discriminating terms and stop terms at each internal node in the topic hierarchy.

2. Description of Related Art

With modern advances in computer technology, modem speeds and network and internet technologies, vast amounts of information have become readily available in homes, businesses and educational and government institutions throughout the world. Indeed, many businesses, individuals and institutions rely on computer-accessible information on a daily basis. This global popularity has further increased the demand for even greater amounts of computer-accessible information. However, as the total amount of accessible information increases, the ability to locate specific items of information within the totality becomes increasingly more difficult.

The format with which the accessible information is arranged also affects the level of difficulty in locating specific items of information within the totality. For example, searching through vast amounts of information arranged in a free-form format can be substantially more difficult and time consuming than searching through information arranged in a pre-defined order, such as by topic, date, category, or the like. However, due to the nature of certain on-line systems, such as the internet, much of the accessible information is placed on-line in the form of free-format text. Moreover, the amount of on-line data in the form of free-format text continues to grow very rapidly.

Search schemes employed to locate specific items of information among the on-line information content, typically depend upon the presence or absence of key words (words included in the user-entered query) in the searchable text. Such search schemes identify those textual information items that include (or omit) the key words. However, in systems, such as the web, or large intranets, where the total information content is relatively large and free-form, key word searching can be problematic, for example, resulting in the identification of numerous text items that contain (or omit) the selected key words, but which are not relevant to the actual subject matter to which the user intended to direct the search.

As text repositories grow in number and size and global connectivity improves, there is a pressing need to support efficient and effective information retrieval (IR), searching and filtering. A manifestation of this need is the recent proliferation of over one hundred commercial text search engines that crawl and index the web, and several subscription-based information multicast mechanisms. Nevertheless, there is little structure on the overwhelming information content of the internet.

Common practices for managing such information complexity on the internet or in database structures typically involve tree-structured hierarchical indices. Many internet directories, such as Yahoo!™ (http://www.yahoo.com) and Infoseek (http://www.infoseek.com) are largely manually organized in preset hierarchies. International Business Machine Corporation has implemented a patent database (http://www.ibm.com/patents) which is organized by the U.S. Patent Office's class codes, which form a preset hierarchy. Digital libraries that mimic hardcopy libraries support some form of subject indexing such as the Library of Congress Catalogue, which is also hierarchical. Such topic hierarchies are referred to herein as "taxonomies." Taxonomies can provide a means for designing vastly enhanced searching, browsing and filtering systems. Querying with respect to a topic can be more reliable than depending only on the presence or absence of specific words in documents. By the same token, multicast systems such as PointCast (http://www.pointcast.com) are likely to achieve higher quality by registering a user profile in terms of classes in a taxonomy rather than key words.

The danger in querying or filtering by keywords alone is that there may be many aspects to, and often different interpretations of the key words, and many of these aspects and interpretations are irrelevant to the subject matter that the searcher intended to find.

Consider, for example, a situation in which a wildlife researcher is attempting to find information about the running speed of the jaguar, using the conventional Alta Vista™ internet search engine (http://www.altavista.digital.com), with the query "jaguar speed". In a test search conducted with the above-noted search engine and query, a variety of responses were generated, spanning the car, the Atari™ video game, the football team, and a LAN server, in no particular order. The first page about the animal was ranked 183, and was directed to a fable.

To eliminate the responses on cars, the test query was then changed to "jaguar speed-car-auto". The top response in the generated results read as follows:

"If you own a classic Jaguar, you are no doubt aware how difficult it can be to find certain replacement parts. This is particularly true of gearbox parts."

The words car and auto do not occur on this page. There was no cat in the first 50 pages of the generated response. Some search engines such as Alta Vista™ propose additional keywords to refine the query, but, at the time of writing, all of the keyword were related to cars or football.

Even the query "jaguar speed +cat"gave unsatisfactory results. The responses included the word "cat", but were often about automobiles. The 25th page was the first with information about jaguars, but did not contain the desired information.

In contrast, if a topic taxonomy such as Yahoo™ is used, there is no problem in insisting that the user seeks documents containing "jaguar" in the topical context of animals, not cars. Unfortunately, it is labor-intensive to maintain Yahoo™ manually as the web changes and grows faster than ever. In our test case, even though the search was easily restricted to within animals, no answer could be found within the relatively small collection returned.

Search engines are still an immature technology. Other areas have been researched intensively long before web search engines were devised, and the following discussion surveys the following overlapping areas of related research: Information Retrieval (IR) systems and text databases, data mining, statistical pattern recognition, and machine learning.

For data mining, machine learning, and pattern recognition, the supervised classification problem has been addressed in statistical decision theory (both classical, as in Wald, *Statistical Decision Functions*, 1950, and Bayesian, as in Berger, *Statistical Decision Theory and Bayesian Analysis*, 1985, each of which is incorporated herein by reference), in statistical pattern recognition (as in Duda and Hart, *Pattern Classification and Scene Analysis*, 1973 and Fukunaga, *An Introduction to Statistical Pattern Recognition*, 1990, each of which is incorporated herein by reference), in machine learning (as in Weiss and Kulikowski, *Computer Systems that Learn*, 1990, Natarajan, *Machine Learning: A Theoretical Approach*, 1991, and Langley, *Elements of Machine Learning*, 1996, each of which is incorporated herein by reference).

Classifiers can be parametric or non-parametric. Two well-known classes of non-parametric classifiers are decision trees, such as CART (as in Breiman et al, *Classification and Regression Trees*, 1984, which is incorporated herein by reference) and C4.5 (as in Quinlan, *C4.5: Programs for Machine Learning*, 1993, which is incorporated herein by reference), and neural networks (as in Hush and Horne, *Progress in Supervised Neural Networks*, 1993, Lippmann, Pattern Classification using Neural Networks, 1989, and Jain et al, *Artificial Neural Networks*, 1996, each of which is incorporated herein by reference. For such classifiers, feature sets larger than 100 are considered extremely large. Document classification may require more than 50,000.

The most mature ideas in IR systems and text databases, which are also successfully integrated into commercial text search systems such as Verity, ConText, and Alta Vista, involve processing at a relatively syntactic level (e.g., stopword filtering, tokenizing, stemming, building inverted indices, computing heuristic term weights, and computing similarity measures between documents and queries in the vector-space model, as described by Rijsbergen, *Information Retrieval*, 1979, Salton and McGill, *Introduction to Modern Information Retrieval*, 1983, or Frakes and Baeza-Yates, *Information Retrieval: Data Structures and Algorithms*, 1992, each of which is incorporated herein by reference). More recent work includes statistical modeling of documents, unsupervised clustering (where documents are not labeled with topics and the goal is to discover coherent clusters, as described in Anick and Vaithyanathan, *Exploiting Clustering and Phrases for Content-based Information Retrieval*, 1997, which is incorporated herein by reference), supervised classification (as in Apte et al, *Automated Learning of Decision Rules for Text Categorization*, 1994, and Cohen and Singer, *Context Sensitive Learning Methods for Text Categorization*, 1996, each of which is incorporated herein by reference), query expansion (as in Schutze et al, *A Comparison of Classifiers and Document Representations for the Routing Problem*, 1995, and Voorhees, *Using WordNet to Disambiguate Word Senses for text Retrieval*, 1993, each of which is incorporated herein by reference).

Singular value decomposition on the term-document matrix has been found to cluster semantically related documents together even if they do not share keywords (as discussed in Deerwester et al, *Indexing by Latent Semantic Analysis*, 1990, and Papadimitriou et al, *Latent Semantic Indexing: A Probabilistic Analysis*, 1996, each of which is incorporated herein by reference). None of these works address the supervised topic analysis problem in a hierarchy or how to use context-dependent words for indexing, how to automatically and efficiently compute good feature sets, and how to maintain disk data structures as training documents and the topic structure changes with time.

Koller and Sahami, *Hierarchically Classifying Documents Using Very Few Words*, International Conference on Machine Learning, July 1997 and Yang and Pedersen, *A comparative study on feature selection in text categorization*, International Conference on Machine Learning, July 1997 discuss classification. Koller et al propose a sophisticated feature selection algorithm that uses a Bayesian net to learn inter-term dependencies. The complexity in the number of features is supralinear (e.g., quadratic in the number of starting terms and exponential in the degree of dependence between terms). Consequently, the reported experiments have been restricted to a few thousand features and documents. Yang and Pedersen's experiments appear to indicate that much simpler methods suffice, in particular, that the approach of Apte et al of picking a fixed fraction of most frequent terms per class performs reasonably. This fraction may be very sensitive to corpus and methodology (e.g., whether stemming and stopwording is performed). This is indicated by the poor performance of methods observed in recent work by Mladenic, *Feature Subset Selection In Text Learning*, 10th European Conference on Machine Learning, 1998.

SUMMARY OF THE DISCLOSURE

Accordingly, it is an object of the present invention to enable scalable, efficient, reliable, and semi-automatic organization and reorganization of a database of information entities, such as text and hypertext documents, into a topic hierarchy with the express, but not exclusive, purpose of facilitating searching and filtering of documents as per the user's information need.

It is an object of further preferred embodiments to provide a system which uses the topic taxonomy to present the user with a series of progressively refined views of document collections in response to queries, and to discover and highlight salient differences between two or more collections of documents.

It is an object of yet further preferred embodiments to provide such a system which is sufficiently fast, for example, for use in conjunction with a crawler or newswire service.

It is yet another object of further preferred embodiments to provide such a system which efficiently updates its knowledge when it makes mistakes and a human intervenes, or when there is a need to modify the topic taxonomy to accommodate new contents.

These and other objects are accomplished, according to preferred embodiments of the present invention, with a system called TAPER, standing for Taxonomy And Path Enhanced Retrieval, as described herein. For every internal node in the taxonomy, TAPER separates feature and noise terms by computing the best discriminant terms for that node. This is accomplished, by computing a measure of discrimination capability or power for each term in each document of a training set. In addition, a cut-off point is computed, for which terms having discrimination powers above the cut-off are considered feature (or discriminant) terms and terms having discrimination powers below the cut-off are considered stop terms or noise terms. In a preferred embodiment, a discrimination measure derived from mutual information (for example, as described by T. M. Cover and J. A. Thomas, *Elements of Information Theory*, John Wiley and Sons, Inc., 1991, incorporated herein by reference) or Fisher's discriminant (for example, as described by R. Duda and P. Hart, *Pattern Classification and Scene Analysis*, Wiley, New York, 1973, incorporated herein by reference) may be used.

Statistical models are constructed for each topic in the taxonomy, using the feature terms determined locally for that topic. In preferred embodiments, a Bernoulli or binary model of text generation may be assumed.

When classifying new documents, only the feature terms therein are used. Such feature terms are relatively few in number, so the class models are small and classification may be accomplished relatively quickly. In contrast to existing classifiers that employ a flat set of classes, the feature set changes by context as the classification process proceeds down the taxonomy. As a result, jargon common to lower nodes (or levels) of the taxonomy are filtered out, as stop words, at each node (or level), and the classification accuracy remains high in spite of the reduction in the number of terms and candidate classes inspected.

Addition and deletion of documents to given topics, as well as reorganization of the topic hierarchy itself, are easily handled. The text models built at each node also yield a means to summarize a number of documents using a few descriptive keywords, referred to herein as their signature.

A taxonomy has been used for illustration purposes for the discussion above. However, the taxonomy may take on various forms, and, in some embodiments of the present invention, is not necessary.

DETAILED DESCRIPTION OF PREFERRED EMBODIMENTS

Querying in a Taxonomy

Figure 1:
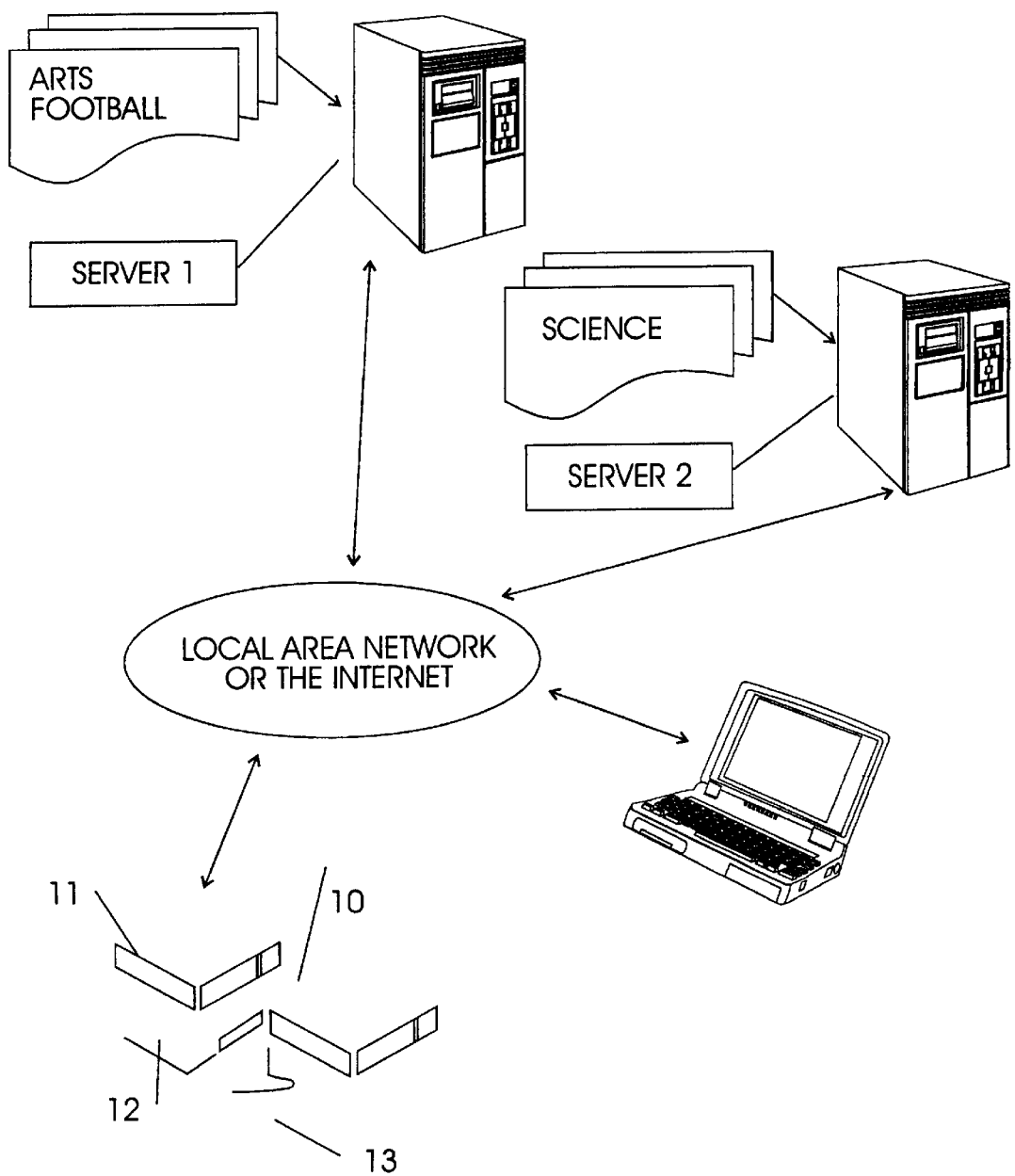
FIG. 1 shows a diagram representing a hardware environment for one preferred embodiment of the present invention.

According to preferred embodiments of the present invention, a search query would not elicit a list of documents, but instead would elicit a list of topic paths. A topic path is a path in a topic taxonomy. For example, the search query "jaguar speed" may elicit a list of topics, as follows:

Business_and_Economy:Companies:Automotive
Recreation:
   Automotive
   Games:Video_Games
   Sports:Football
   Science:Biology:Animal_Behavior Thereafter, the user may restrict queries by concept, not by keyword. A concept is more general than a keyword. For example, the concept "animal" together with the keyword "jaguar" is a better query than "jaguar" alone. A keyword is syntactically embedded or implied by a document, whereas a concept is a semantic attribute. A concept could even be functional (e.g., irrespective of syntactic content, a site can be categorized as "commercial" or "academic"). Moreover, the same keyword may induce different concepts (e.g., "jaguar" in the context of "animal" vs. "car").

Upon obtaining a list of topic paths, the user may restrict the search to only one topic path or a few selected topic paths, by selecting one or more topics in the list. Depending upon the depth of the taxonomy, the selection of one or more topic paths may result in a list of further topic paths, representing further levels of the taxonomy.

As shown above, designing the query to enforce or forbid additional keywords may not always be as effective as restricting the search to particular topic paths. The ability to restrict searches to particular topic paths may be very useful for multicast channels as well. Additionally, user profiles will be topic paths rather than keywords.

Scalable Filtering Using a Topic Taxonomy

Another paradigm of information retrieval is filtering, in which a continual stream of documents are generated on-line, as in newsgroups and newsfeed. The system collects interest profiles from users and uses them to implement either content-based or collaborative filtering, i.e., it notifies the user only of those documents they are likely to be interested in.

In its simplest form, a profile may be a set of terms and phrases specified explicitly by the user. This has the same problem as querying without topic context as discussed above. A better notion of a profile is the set of documents the user has seen and/or liked, perhaps with scores. This may work well with small systems, but for thousands of users and millions of documents, a system storing this level of detail will not scale. A promising alternative is to characterize profiles, not at the level of individual documents, but at the level of narrow but canonical topics. This can be realized as one embodiment of the present invention.

Context Dependent Signatures

An exhaustive keyword index employed by such systems as Alta Vista™ is perhaps more of a problem than a solution. The IR literature has advanced further, and now prototypes exist that extract signature terms, which are then used for indexing. These signatures can also be used as summaries or thumbnails. The descriptive power of signatures can often compare favorably with that of arbitrary sentences as extracted by popular search engines. The signatures are also effective for describing a document cluster. Many approaches have been used for signature extraction, and in one common approach, the most frequent terms that are not stopwords are selected.

A document abstract or signature as a function of the document alone is of limited utility. In the case of a taxonomy, a useful signature is a function of both the document and the reference node. The signature includes terms that are "surprising" given the path from the root to the reference node. In the above example, car and auto may be good signature terms at the top level, or even at the Recreation level, but not when the user has drilled down to Recreation:Automotive.

The following is an illustration of text from a document in Health Nursing (http://www2.best.com/goodnews/practice/faq.htm):

"Beware of the too-good-to-be-true baby that is sleeping and sleeping and doesn't want to nurse. Especially monitor the number of wet diapers, as seriously jaundiced babies are lethargic."

The first level classification is Health. The top signature terms are computed with respect to Health as follows:

Jaundice, dampen, dehydration, lethargic, hydrate, forcibly, caregiver, laxative, disposable.

This indicates that the document is about treating jaundice. The second level classification is Health:Nursing. Shifting the reference class, the new signature is computed to be:

Baby, water, breast-feed, monitor, new-born, hormone.

This now indicates that the document is about nursing babies. This information comes from both the path and the signatures. Techniques for computing context-sensitive signatures are described herein. Thus, significant improvement in search quality may be possible by maintaining functionally separate indices at each taxonomy node, using only a few signature terms from each document.

Context Dependent Term Associations

Finding term associations is another application of context-sensitive signatures. The use of phrases for search and classification can potentially boost accuracy. The usual way to find phrases is to test a set of terms for occurrence rate far above that predicted by assuming independence between terms. Unfortunately, associations that are strong for a section of the corpus may not be strong globally and may go unnoticed. For example, the term "precision" may be visibly associated with the term "recall" in a set of documents on IR, but not in a collection also including documents on machine tools. Computing signatures at each node can expose all such associations.

Context Dependent Feature Selection

Separating feature terms from noise terms is central to preferred embodiments described herein. In the above examples, car and auto should be "stopwords" within Recreation:Automotive and, therefore, should be pruned from the signatures. Feature and noise terms must be determined at each node in the taxonomy.

It is tricky to hand-craft the stopwords out of domain knowledge of the language. For example, the term "can" is frequently included in stopword lists. However, that term should not be a stop term for a corpus on waste management. The contents of a stopword list should be highly dependent on the corpus. This issue looms large in searching using categories and clusters. In hierarchical categories, the importance of a search term depends on the position in the hierarchy.

Other Applications of Feature Selection

Feature selection is also useful in any setting in which salient distinctions are sought between two or more sets of documents. Consider the scenario in which a set of documents (e.g., a keyword query result) has been clustered into subsets, and a user wishes to annotate the clusters using salient keywords. The clusters can be regarded as classes, and feature selection can be used to find these keywords.

Another application of feature selection is in the discovery of succinct differences between two sets of documents, such as patents filed by two companies, or by the same company over two different time intervals, to expose interesting trends over time.

Hardware Environment

As noted above, the present invention relates, generally, to a process, system and article of manufacture for organizing, classifying, and indexing information items by topic, such as text and hypertext documents. In one example embodiment, such information items comprise documents accessible on the internet. However, it will be understood that further embodiments of the invention are applicable to information items accessible in local network environments, dedicated database environments, or the like.

An example hardware environment for an internet embodiment is shown in FIG. 1, which includes a user computer 10, a user display 11, and a user interface 12. The display 11 is preferably a visual display device, such as a cathode ray tube monitor, a liquid crystal monitor or other suitable display device. The user interface 12 preferably comprises one or more of a key board, mouse, touch-screen device or other suitable input device. The computer 10 operates in accordance with a software program stored on a computer readable medium, such as a floppy disk 13, hard disk (not shown) or other suitable storage medium.

The computer 10 is linked, through an internet connection, and operates in accordance with a suitable software program to access information items stored in at least one information database. In the illustrated embodiment, the information items comprise text documents stored or accessible through one or more server locations. For example, with reference to FIG. 1, a set of text documents on a variety of topics are stored or accessible through the Server 1 location, and a further set of text documents on a variety of topics are stored or accessible through the Server 2 location. Further, server locations (not shown) may store or provide access to additional documents.

Figure 2:
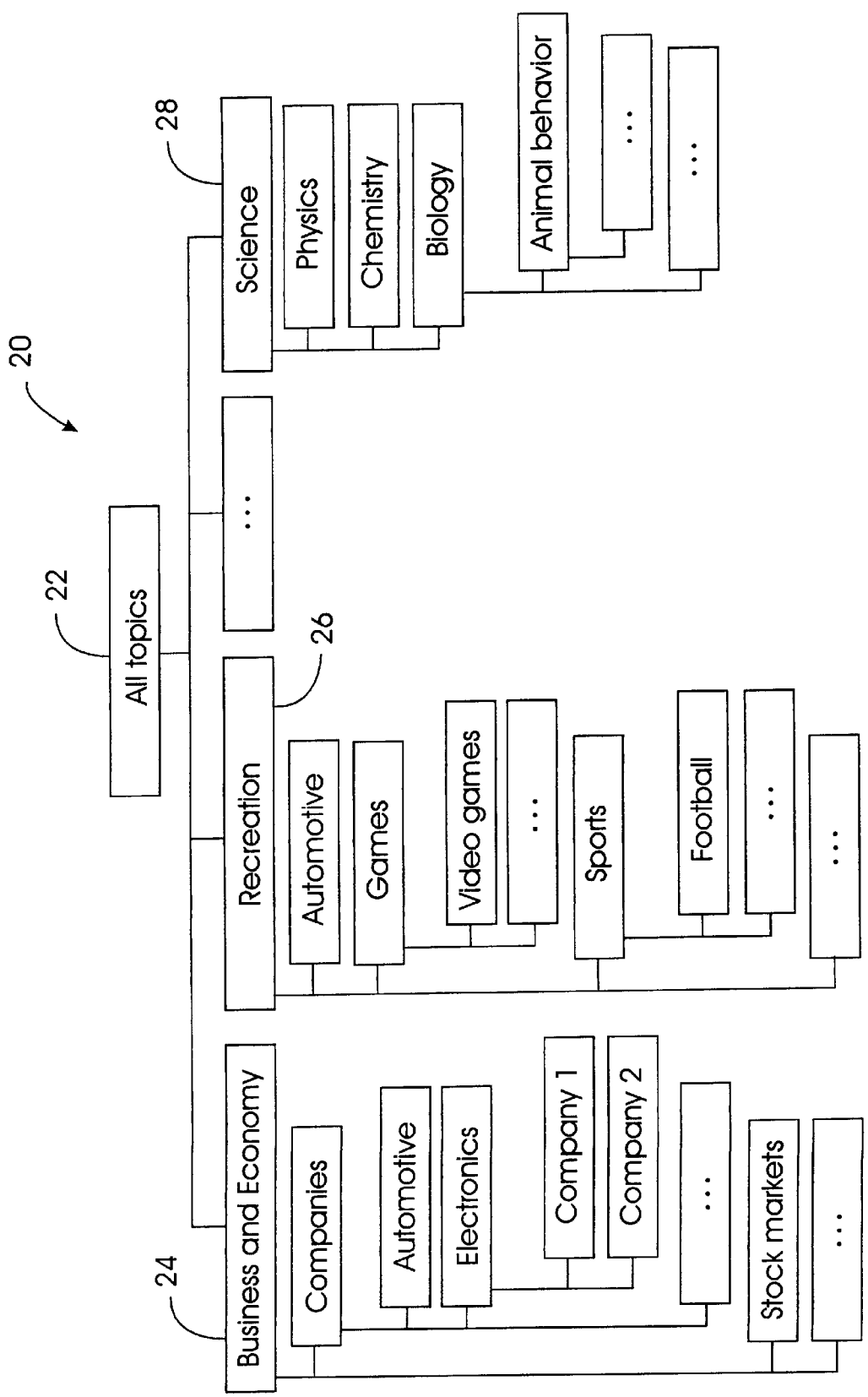
FIG. 2 shows a tree-shaped topic hierarchy which may be employed with one embodiment of the present invention.

As described in further detail herein, preferred embodiments of the present invention include a system comprising a computer, display and user interface, which operate in accordance with a process stored as a program on a computer readable medium, to organize and classify information items. While such information items may be text documents accessible through an internet connection, as shown in FIG. 2, it will be understood that, in further embodiments, the system may operate with information items other than those available on the internet, including, but not limited to information items accessible through local networks, dedicated databases, or the like. However, for purposes of simplifying the present disclosure, embodiments of the present invention are described herein primarily with reference to a search and classification system which operates with information items in the form of text documents that are accessible through an internet connection with the internet.

As described in further detail below, embodiments of the invention relate to an automatic process for learning topics from examples and later identifying topics of new documents (also called "test documents"). The process employs a multilevel taxonomy having a plurality of nodes, including a root node, at least one intermediate node associated with and under the root node and a plurality of terminal nodes associated with and under each intermediate node. A different set of feature terms are associated with each intermediate node, which are used to classify test documents. The feature term sets are determined, according to preferred embodiments, during a training procedure.

The training procedure, according to preferred embodiments, employs a plurality of training documents that have been pre-assigned manually to various terminal and intermediate nodes in the taxonomy. The training documents are tokenized, and information related to the frequency of terms or tokens is recorded in a database. A discrimination value is determined for each term in the training documents, and a minimum discrimination value is determined. Then, for each intermediate node, a set of feature terms is selected, where the feature terms are those that are in the training documents associated with the intermediate node or any of its descendants and that have discrimination values equal to or above the minimum discrimination value for the intermediate node.

In one preferred embodiment, such as related to finding salient differences between two or more sets of documents, the process ends here, after having output the best features.

In another embodiment, once the system is trained, test documents are analyzed. During this phase, a text document is first tokenized. Of all the tokens in the document, only those that are also in the feature set of the root topic in the taxonomy are considered useful. The statistics related to these useful terms are retrieved from the database, and the statistics are used to compute a score for each of the children of the root node (nodes comprising the next level connected to the root node). A few children with high scores are then picked for further exploration. If any child is an intermediate node, it has associated with it another feature set. The set of all tokens in the test document is now intersected with this new feature set, and the procedure continues from the child in the same manner.

In a related embodiment, the system also computes, for each topic node with suitably high score, the terms in the test document that are significantly more frequent than in the training set for that topic. These are then used for building a term index.

In yet another preferred embodiment, the above system can be used to process a search query. The search query is received from the user, for example, through a user input device in the form of keywords. Optionally, the user also restricts the topical context using a suitable selection on the taxonomy. Then a plurality of relevant documents which also adhere to the topic restrictions is retrieved. In a preferred embodiment, each document in the database has been pre-classified using the above system. The user is presented with a suitable display of those portions of the taxonomy where relevant documents were found. The user may then enter a command through the user input device to cause the system to select at least one of the displayed sub-topics. This process is repeated as necessary to refine the query topic until the user's information need is satisfied.

Topic Hierarchy

Organization and classification of information items, according to embodiments of the present invention, involves a topic hierarchy, or "taxonomy," preferably having a plurality of levels of nodes. While embodiments of the invention may employ any directed acyclic graph hierarchy structure, embodiments are described herein with reference to a tree-like topic hierarchy.

An example of a tree-like topic hierarchy, or taxonomy, for organizing a database of topical documents is shown in FIG. 2. The tree 20 includes a first level comprising a single node 22 titled "All Topics." A second level of the tree may divide the first level "All Topics" node into several further nodes directed to general topic categories, such as Business and Economy 24, Recreation 26, Science 28, and so forth. Each of the second level nodes may be divided, at the third level, into several further nodes directed to more specific topics within each second level topic. For example, at the third level, the Business and Economy topic 24 may be divided into Companies, Stock Markets, and so forth. Similarly, each of the other second level topics may be divided at the third level to further topics. Also, in a similar fashion, further levels under the third level may be included in the topic hierarchy, or taxonomy. The final level of each path in the taxonomy terminates at a terminal or leaf node, labeled c in the diagram. The taxonomy in the diagram is provided as an example for purposes of simplifying the present disclosure and is not intended to limit the invention to the specific illustration of the taxonomy.

According to preferred embodiments of the present invention, an appropriate topic hierarchy, or taxonomy, is provided by the user, based on the material (for example text documents) that are intended to be classified and searched. For example, if the material to be classified and searched includes major topics on the internet, a taxonomy might appear as shown in FIG. 2. As another example, if the material to be classified and searched includes all U.S. patents, a taxonomy which more closely follows the U.S. Patent and Trademark Office classification system might be employed.

System Training

Before the system can analyze the topics of new documents, the system is provided with examples of documents belonging to given topic(s). Given a topic hierarchy (taxonomy), system training is performed by providing an initial collection of documents for which classifications are known in advance. With reference to the block diagram of a training system 30 of FIG. 3, this may be accomplished, for example, by collecting a number of documents 32. For example, for classification and searching of documents available on the internet, the document collection may be performed with a suitable web crawler. Alternatively, a sample document collection may be provided with the system software 13 (FIG. 1) or manually collected from any suitable source.

The sample document collection is divided into two sets. One set of documents is set aside as a testing set 34. The other set is manually classified or otherwise pre-designated as corresponding to a particular class or terminal node (or, in some cases, intermediate node) within the given topic hierarchy and becomes the training set 38. At block 40, the training set of documents 38 is split, preferably randomly, into a statistics collection set of documents 42 and a model validation set of documents 44.

In block 46, statistics are collected from the statistics collection set 42, based on terms appearing in those documents and the known classes for those documents. These statistics are used in the determination of the discriminating power of terms in the documents from the collection set 42. The statistics are calculated for each node in the taxonomy, such that, for any one node, the discriminating power is calculated for the terms in all of the documents that are classified in terminal (and intermediate) nodes below that node. That is, the power that each term has to discriminate between classes in the next level below each node is calculated.

Thus, with reference to the hierarchy represented in the FIG. 2, statistics are calculated for the "science" node 28, based on the terms in all of the documents d from the collection set 42 that are classified in classes represented by nodes (terminal and intermediate) below the "science" node 28, including the nodes labeled "biology," "chemistry," "electronics," and all children nodes of those nodes. Similarly, statistics are calculated for the terms in all of the documents (from the collection set 42) under each of those intermediate nodes and each of the other intermediate nodes in the hierarchy.

The statistics calculated for each intermediate node in the hierarchy includes quantities that enable computing the "discriminating power" of each term found in some training document under the node. Based on these statistics, terms are ordered by decreasing discriminating power and the top discriminating terms (those terms with the highest discriminating power) are selected as feature terms for use in classification, while the remaining terms are characterized as stop terms that have little value in distinguishing between topics in the immediate context. The determination of which terms in the order are feature terms and which terms are stop terms is provided by selecting a cut-off point within the ordering.

Figure 3:
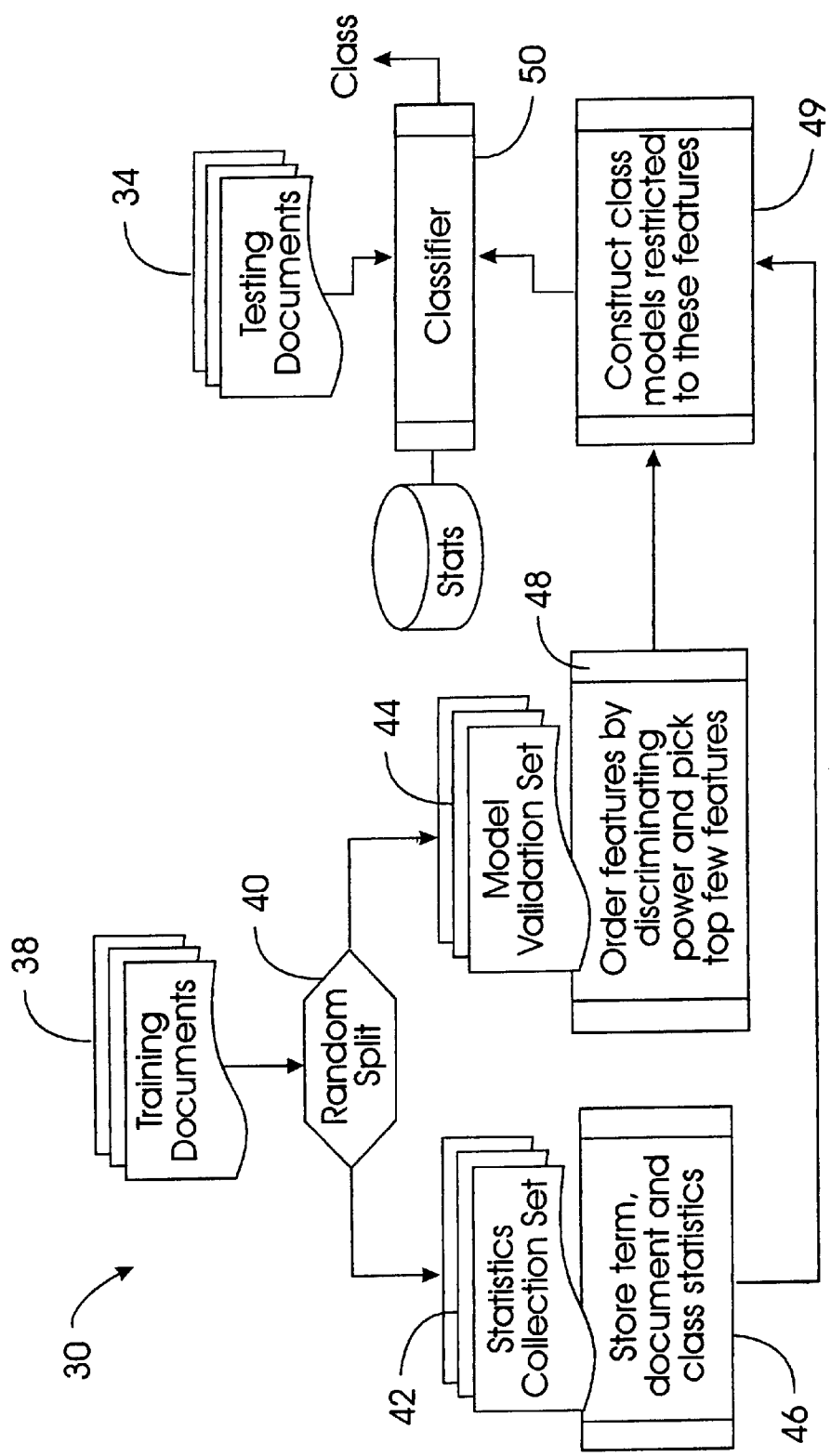
FIG. 3 shows a block diagram representing a classifier training and feature selection system according to a preferred embodiment of the present invention.

At block 42 in FIG. 3, the "statistics collection" subset of the training documents are used to collect term frequency information. Then, in block 48, feature terms and stop terms are determined for each internal topic node based on the model validation set 44. Finally, class models are constructed over the chosen features in block 49, preferably as described below in the section titled "Document Models."

The class models and statistical information calculated in block 46 are provided to the classifier 50, for classifying the test documents 34 in a testing mode, as well as new documents when the system is deployed. Classification of test (or new) documents is carried out in the taxonomy, such that each test (or new) document is ultimately classified to correspond to one or more classes, designated by terminal or leaf nodes (or, in some cases, intermediate nodes in the hierarchy).

Figure 4:
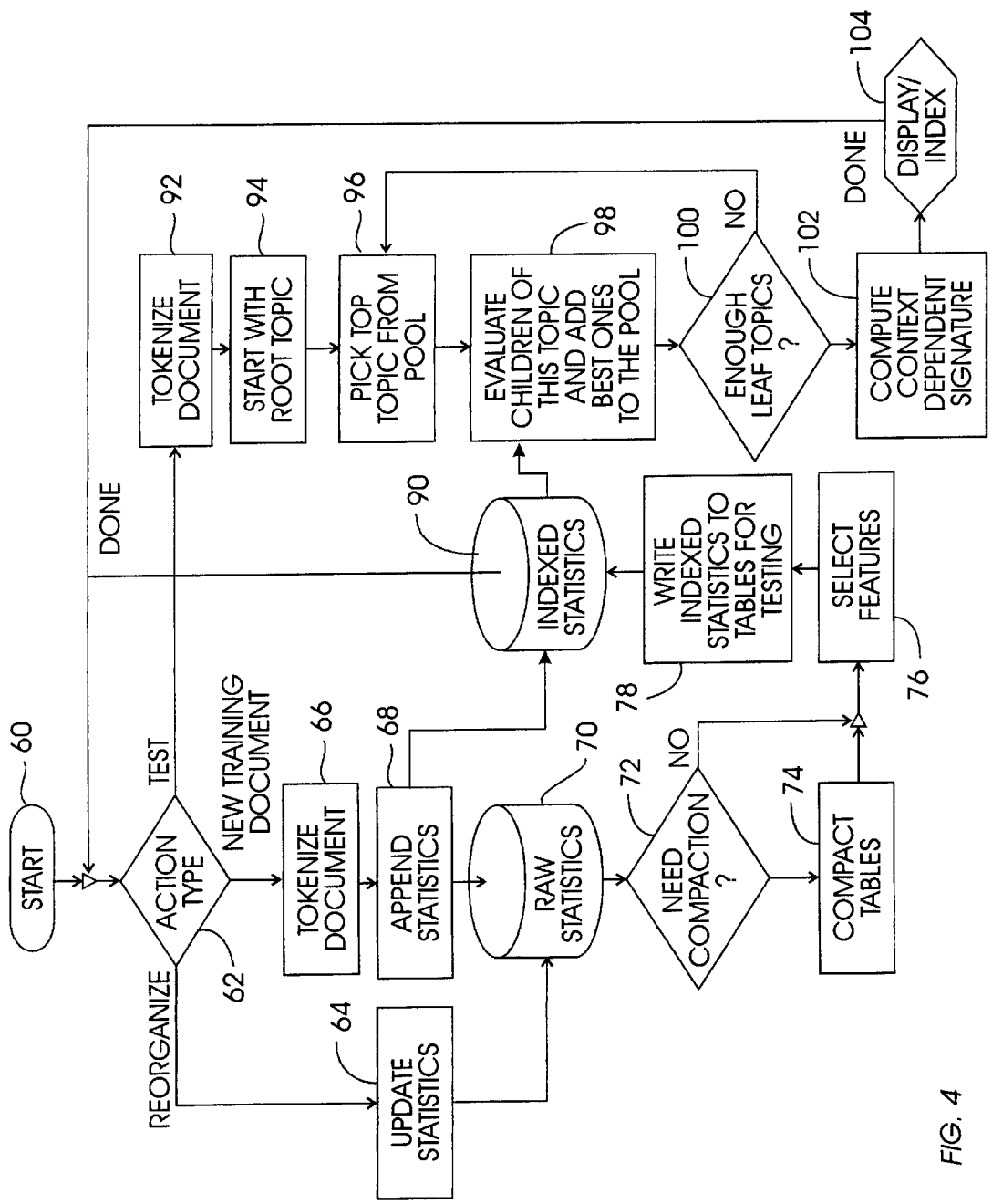
FIG. 4 is a flow diagram illustrating the steps performed by the present invention for reorganizing, training, and testing.

FIG. 4 is a flow diagram illustrating the steps performed by the present invention for reorganizing, training, and testing. After starting at block 60, in block 62, an action type is determined.

If the action type is "reorganize", then, statistics are updated in block 64 and stored in the raw statistics database in block 70. Reorganization refers to a change in the structure of the topic tree. For example, one type of change involves collapsing two topics into one (e.g., a "science" topic may be collapsed with a "mathematics" topic). Another type of change involves expanding a topic into multiple topics (e.g., a "mathematics" topic may be expanded into a "calculus" topic, a "linear algebra" topic, and other topics). Once statistics are stored in the raw database in block 70, processing continues at block 72.

In block 72, whether compaction is needed is determined. As will be discussed under the "Statistics Collection" heading below, compaction refers to merging an unsorted table into the main sorted table. If compaction is needed, then tables are compacted in block 74. If compaction is not needed or after compaction, the processing continues to block 76. In block 76, features are selected. Feature selection will be discussed in more detail below under the "Feature Selection" heading. In block 78, indexed statistics are written to tables for testing. The statistics are stored in the indexed database in block 90.

If the action type is "new training document", then the document is tokenized in block 66. Next, in block 68, statistics are appended. In block 70, the appended statistics are stored in the raw statistics database. Also, the appended statistics are stored in the indexed database in block 90. Then, processing continues at block 72, as discussed above.

If the action type is "test", documents are tokenized in block 92. In block 94, the root topic is selected as a starting point. In block 96, a top topic is picked form the pool (i.e., a topic with a high goodness score). In block 98, using indexed statistics from block 90 (as indicated by the arrow from block 90 to block 98), the children of the picked topic are evaluated and the best ones (i.e., those with high goodness scores) are added to the pool. In block 100, it is determined whether there are enough leaf topics. If there are not enough leaf topics, at block 96, another topic is picked. Otherwise, the context-dependent signatures are computed in block 102. The computation of context-dependent signatures is discussed in more detail under the "Extracting Document Signatures" heading below. These context-dependent signatures are displayed or indexed in block 104.

Document Models

There have been many proposals for statistical models of text generation. One of the earliest indicators of the power of simple statistical tests on term frequencies is Zipf's law. The models most frequently used in the IR community are Poisson and Poisson mixtures. If X is distributed Poisson with rate $\mu$, denoted X~P(x), then $\Pr[X=x]=e^{-\mu}\mu^x/x!$, and if Y is distributed Bernoulli with n trials and mean np, denoted Y~B(n,p), then $$\Pr[Y=y] = \binom{n}{y} p^y (1-p)^{n-y}.$$

As n→∞ and p→0, the distributions B(n,p) and P(np) converge to each other.

According to preferred embodiments described herein, a Bernoulli or binary model of document generation is assumed. In the Bernoulli model, a document d is generated by first picking a class c. Each class has an associated multi-faced coin, with each face representing a term t and having some success probability θ(c,t). Then a document length n(d) is arbitrarily fixed, and each term is generated by flipping the coin. In the binary model, a document is a set of terms with counts zero or one, and θ(c, t) is an estimate of the fraction of documents in class c that contain term t at least once.

Generally, in a binary model, the focus is on whether a term occurs, and so a term is either associated with zero (i.e., occurs) or one (i.e., does not occur). In a Bernoulli model, the focus is on how many times a term occurs, and so the model keeps track of "buckets" for the number of times a term occurs (e.g., once , twice, three times, . . . , n times). However, a variety of other models could be used. For example, in one model, it may be relevant that a term occurred once, twice, three times or four or more times, while it is not relevant that the term occurred specifically four times, five times, . . . , n times. In another model, the "buckets" could be specified to hold terms that occur "once", "two to three times", "four to seven times", etc.

Conceptually, as the training text is being scanned, the classifier database will be organized as a three-dimensional table. The first axis is for terms, the second axis is for documents, and the third axis is for classes or topics. The measure maintained along these dimensions, (t,d,c), is called n(t,d,c), which is the number of times t occurs in d∈c. This number is non-zero only when t∈d∈c. t∈d means that term t occurs in document d, and d∈C means that d is a training sample for class c. A super-class of c, i.e., an ancestor in the topic tree, inherits all d∈C .

Aggregation along some dimensions gives some important statistics about the corpus that is used by the classifier. The following is a list of these statistics:

The length of training document d, given by $n(d)=\Sigma_t n(t,d,c)$. The length of all documents can be found using a GROUP BY on (d,c).

The total length of the training documents in class c, denoted n(c).

The total number of times that term t occurred over all training documents of class c, denoted n(t,c).

The fraction of times, $f(t,d,c)=n(t,d,c)/\Sigma_{96} n(\tau,d,c)$, that term t occurs in document d. The sum of f and $f^2$ over all documents in a class is needed.

The number m(t,c) of training documents in class c that have at least one occurrence of term t. This will be needed for the binary model.

The number of training documents in class c, denoted |c|.

Assuming the Bernoulli model with parameters $\theta(c,t)$, the following equation, $$\Pr[d|c] = \binom{n(d)}{\{n(d,t)\}} \prod_t \theta(c,t)^{n(d,t)},$$

where $$\binom{n(d)}{\{n(d,t)\}} = \frac{n(d,t)!}{n(d,t_1)!n(d,t_2)!\ldots}$$

is the multinomial coefficient. A corresponding expression can be easily derived for the binary model as well.

The Bernoulli model makes the assumption that term occurrences are uncorrelated, which is not accurate. First, given that a term has occurred once in a document it is more likely to occur again when compared to a term about which information is not available. Second, the term frequency distributions are dependent.

Our independence assumption leads to what is called a naive Bayes classifier. (A naive Bayes classifier, in essence, builds density functions, which are marginally independent, for each class, and then classifies a data point based on which density function has the maximum value at that point.) In practice, these simple classifiers perform surprisingly well compared to more sophisticated ones that attempt to approximate the dependence between attributes.

Recently this phenomenon has been investigated in depth by Friedman in On Bias, Variance, 0/1 Loss, and the Curse-of-dimensionality, Data Mining and Knowledge Discovery, 1(1), pp. 55–77, 1997, incorporated herein by reference). A classifier that uses an estimate of class densities is subject to bias (decision boundaries that are shifted from the "best" position, because the model is inaccurate) and variance (decision boundaries fit to noisy data). Friedman analyzes how the low variance of naive density estimates can mitigate the high bias to give simple classifiers that can often beat more sophisticated ones. It will also be clear from a description of the system that this simplicity enables designing of a system that can handle enormous problem sets.

Rare Events and Laws of Succession

The average English speaker uses about 20,000 of the 1,000,000 or more terms in an English dictionary. In that sense, many terms that occur in documents are "rare events." This means that with reasonably small sample sets, there will be zero occurrences of many terms in many classes, and the maximum likelihood estimate $\theta(c,t)=n(c,t)/n(c)$ will be problematic: a class with $\theta(c,t)=0$ will reject any document containing t even a single time.

Finding better estimates of small probabilities, also called laws of succession, has been pursued in classical statistics for centuries. Laplace showed that given the results of n tosses of a L-sided coin, i.e., the number of times each face occurred, $n_1 \ldots, n_L$, the correct Bayesian estimate for the probability of face i is not $n_i/n$, but $$\frac{n_i+1}{n+L}.$$

This is the result of assuming that all possible associated L-component vectors of face probabilities $(p_1, \ldots p_L)$ are a priori equally likely. This is called the uniform prior assumption. The above value of is obtained by using Bayes rule and evaluating $$\frac{1}{\Pr[n_i]} \int_0^1 \theta \Pr[n_i|\theta] d\theta.$$

Alternative priors have been suggested and justified. (E. S. Ristad, *A natural law of succession*, Research report CS-TR-495-95, Princeton University, July 1995, which is incorporated herein by reference.) However, based on experimentation conducted in connection with the development of the present invention, it was found that Laplace's law provides a few percent better classification accuracy. With this adjustment (and returning to the earlier notation) $\theta(c,t)$ is estimated as $$\frac{1+n(c,t)}{n(c)+L(c)}$$

where $L(c)$ is the size of the lexicon (the number of distinct terms found in the training documents) of class c.

Hierarchical Classification

A classifier inputs a document and outputs a class. If the class is not the one from which the document was generated, the classifier is said to have misclassified that document. In the case of a topic hierarchy, one may wish to give the classifier "partial credit" for correctly finding the first few levels of the "true" topic. This is ignored in the current discussion and will be commented on later. For now the discussion focuses on how to find the best leaf topics.

According to preferred embodiments of the present invention, a distinct classifier is associated with each internal node in the taxonomy, including the root. During classifier training, a set of feature terms is generated for each of such nodes. Given a new document d, the goal of the classification process is to find a leaf node c such that the probability that the document d was generated from class c (called the posterior probability $\Pr[c|d]$) is maximized among all the leaves.

Hierarchical classification has the benefit of greatly increased speed of classification. As described next, classification of a test document starts at the taxonomy root by assigning a score to each child of the root. In many cases, it will be possible to eliminate most of the topic sub-trees as unlikely candidates. Thus, large sub-trees in the topic tree can be eliminated forthwith if the score of the root of those sub-trees are very poor. Text database population is not the only application of fast multi-level classification. With increasing connectivity, it will be inevitable that some searches will go out to remote text servers and retrieve results that must then be classified in real time.

This benefit of increased speed may be useless if an error is made in choosing a topic early in the process at a shallow level of the tree. Thus, a greedy search for the best leaf may be risky. Let the path to a leaf c from the root $c_1$ be $c_1$, $c_2, \ldots, c_k=c$. Since the root subsumes all classes, the probability that any document d is within the root class $c_1$ is $\Pr[c_1|d]=1$. Thereafter, $\Pr[c_i|d]=\Pr[c_{i-1}|d]\Pr[c_i|c_{i-1},d]$, for $i=2,\ldots,k$. Taking logs, $\log \Pr[c_i|d]=\log \Pr[c_{i-1}|d]+\log \Pr[c_i|c_{i-1},d]$. Suppose that, in the taxonomy, the edge $(c_{i-1},c_i)$ is marked with the edge cost $-\log \Pr[c_i|c_{i-1},d]$. Then the least-cost path from the root to some leaf is being sought.

Computing the one-step conditional probability $\Pr[c_i|c_{i-1},d]$ is straight-forward. For notational convenience, name $c_{i-1}$ as $r_0$ and its children $\{r_j\}$. Then the probability that the document d belongs to the child node $r_j$, given that it belongs to the parent node $r_0$, is given by $\Pr[r_j|r_0,d]=\Pr[r_j|d]/\Pr[r_0|d]$, where $\Pr[r_0|d]=\Sigma_\rho \Pr[\rho|d]$, where the sum is over all children $\rho$ of $r_0$. Note that $\Pr[r_j|d]=\Pr[d|r_j]/\Sigma_\rho \Pr[d|\rho]$ using Bayes rule, and this can be evaluated from the model parameters. Care is needed here with finite-precision numbers and underflow, because the probabilities are very small and the scaling needed to condition the probability prevents maintaining the numbers always in log-form.

Feature and Noise Terms

The above application of Bayes rule depended on a document model. This was embedded in the $\theta(c,t)$ parameters. These parameters are estimated during the training phase, using sample documents from the statistics collection set 42 (FIG. 3). When building a model for each class from a training set, a determination is made as to whether a term appears only incidentally, or sufficiently consistently to suspect a causal connection; the term is accordingly a noise term (also called a stopword) or a feature term. Only feature terms should be used for classifying new documents.

A property of preferred embodiments of the present invention that distinguishes it from prior art (as in Apte, Damerau, and Weiss, 1994) is the use of different feature sets computed separately for each internal node. This prevents the classifier from losing accuracy even though it inspects very few of the classes in the taxonomy to pick the best leaf topics.

The challenge is to select suitable feature terms from a lexicon that can be as large as a hundred thousand terms. The selection process is constrained both ways: the highly discriminating terms should not be missed, and every term should not be included, because the frequencies of some terms are noisy and not indicative of content. This is called the feature-selection problem in the statistical pattern recognition literature. In general, there is a need to find a set of terms that minimizes the probability that a document is misclassified, with the understanding that only terms in the intersection of the document and the feature set are used by the classifier.

It is not possible to search for the best feature set, because it is not known what the best possible classifier does, and because there are too many terms in the lexicon. Therefore, in practice this is done for a fixed classifier. A heuristic is desired that is essentially linear in the original number of terms and preferably makes only one pass over the training corpus.

Therefore, the following approach is carried out: first a merit measure is assigned to each term, and then a prefix of terms with highest merit are selected. In preferred embodiments, the merit measure comprises an index based on mutual information or on Fisher's linear discriminant. Mutual information is a well-known statistical measure of dependence between random variables (see Cover and Thomas). It is straight-forward to apply mutual information to the binary document model, but it is more complicated to apply it to the Bernoulli model, and more expensive to evaluate. Next, the Fisher discriminant measure that was used in the present invention is described, and this measure was found to be more effective than mutual information.

Fisher's Discriminant

Suppose two sets of points are given in k-dimensional Euclidean space, interpreted as two classes. Fisher's approach finds a direction on which to project all the points so as to maximize (in the resulting one-dimensional space) the relative class separation as measured by the ratio of inter-class to intra-class variance. More specifically, let X and Y be the point sets, and $\mu_X, \mu_Y$ be their respective centroids, i.e., $$\mu_X = \frac{1}{|X|}\sum_{x \in X} x$$

and $$\mu_Y = \frac{1}{|Y|}\sum_{y \in Y} y.$$

Further, let the respective covariance matrices be $$\sum_X = \frac{1}{|X|}\sum_{x \in X}(x-\mu_X)(x-\mu_X)^T$$

and $$\sum_Y = \frac{1}{|Y|}\sum_{y \in Y}(y-\mu_Y)(y-\mu_Y)^T.$$

Fisher's discriminant approach seeks to find $\alpha$ vector a such that the ratio of the projected difference in means, $|\alpha^T(\mu_X-\mu_Y)|$, to the average variance, $\frac{1}{2}\alpha^T(\Sigma_X+\Sigma_Y)\alpha=\alpha^T\Sigma\alpha$, is maximized. It can be shown that $\alpha=\Sigma^{-1}(\mu_X-\mu_Y)$ achieves the extremum, provided $\Sigma^{-1}$ exists. Furthermore, when X and Y are drawn from multivariate Gaussian distributions with $\Sigma_X=\Sigma_Y$, this is the optimal discriminator, in that computing $\alpha^T q$ for a test point q and comparing the result to a suitable threshold is the minimum error classifier.

Computing $\alpha$ involves a generalized eigenvalue problem involving the covariance matrices. In applications such as signal processing where Fisher's discriminant is used, the matrix size k is typically a few hundred at most. In the text domain, the matrix size k is typically 50,000 to 100,000, and the covariance matrices may not be suitably sparse for efficient computation. Moreover, it is difficult to interpret a discriminant that is a linear sum of term frequencies, possibly with negative coefficients. A preferred approach, therefore, will be to take the directions $\alpha$ as given, namely, a coordinate axes for each term. A figure of merit is assigned to each term, which is called its Fisher index, based on the variance figures above, which is $$\frac{|\alpha^T(\mu_X - \mu_Y)\alpha|}{\alpha^T \Sigma \alpha}$$

in the two-class case. For each term t, $\alpha=\epsilon_t$ is a unit vector in the direction of t.

In general, given a set of two or more classes $\{c\}$, with $|c|$ documents in class c, the ratio of the so-called between-class to within-class scatter is computed. Switching back to term frequency notations, this is expressed as $$\text{Fisher}(t) = \frac{\sum_{c_1,c_2}(\mu(c_1,t)-\mu(c_2,t))^2}{\sum_c \frac{1}{|c|}\sum_{d\in c}(n(t,d,c)-\mu(c,t))^2},$$

where $$\mu(c,t) = \frac{1}{|c|}\sum_{d\in c} n(t,d,c).$$

Selecting a Cut-Off

The remaining exercise, having sorted terms in decreasing order of Fisher index, is to pick a suitable number of feature terms starting with those having the highest index. Let F be the list of terms in our lexicon sorted by decreasing Fisher index. A preferred heuristic is to pick from F a prefix $F_k$ of the k most discriminating terms. $F_k$ must include most useful features and exclude most noise terms. A short $F_k$ enables holding a larger taxonomy in memory and hence fast classification. Too large an $F_k$ will degrade not only performance, but also accuracy because of the phenomenon of over-fitting: the classifier will fit the training data very well, but will result in degraded accuracy for test data. There are various techniques for pruning feature sets. The current invention prefers the technique of minimization of the classification error rate on a separate validation set. There exist other approaches in the prior art using the minimum description length principle, resampling or cross validation, but these make too many passes over the text corpus.

The pre-classified samples are partitioned, preferably randomly, into the training set T (shown as block 42 in FIG. 3) and the validation set V (shown as block 44 in FIG. 3). The Fisher index of each term based on documents in set T is computed, and then documents in set V are classified using various prefixes $F_k$. Let $N_k$ be the number of documents incorrectly classified when a prefix of k features is used, then (the smallest) k for which $N_k$ is minimized is sought.

For classification using a feature set $F_k$, the class c is chosen that maximizes the following a posteriori class probability based on the Bernoulli model described above:

$$\Pr[c\mid d, F_k] = \frac{\pi(c)\prod_{t\in d\cap F_k} f(c,t)^{n(d,t)}}{\sum_{c'} \pi(c')\prod_{t\in d\cap F_k} f(c',t)^{n(d,t)}},$$

where $\pi$ is the prior distribution on the classes. Let $c_*(d)$ be the "true" class of $d\in V$, then $N_k=\Sigma_d N_k(d)$, where $$N_k(d) = \begin{cases} 1, & \exists c \neq c*(d): \Pr[c\mid d, F_k] > \Pr[c*(d)\mid d, F_k] \\ 0, & \text{otherwise.} \end{cases}$$

In effect, the overall plot is constructed of the fraction of documents incorrectly classified against the number of features used by averaging the per-document function written above. For a fixed document in the model validation set, the class for that document is first estimated based only on the highest Fisher value term in the order. If the class estimate is erroneous, the error is 1 for that document. If the class estimate is correct, then an error rate of 0 (zero) is plotted for the term number 1, for that document.

Figure 5:
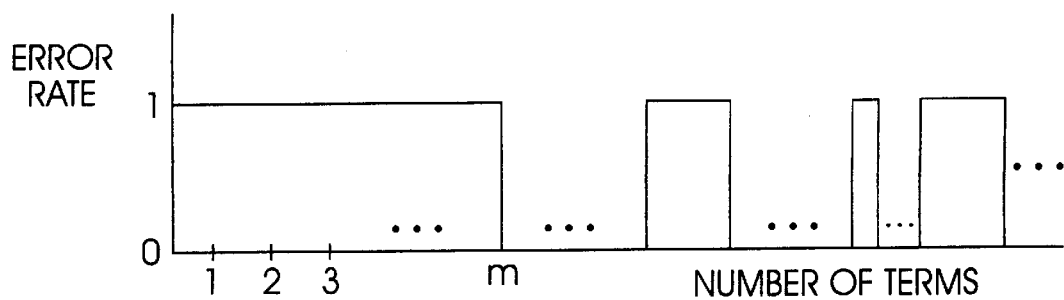
FIG. 5 shows a graphical representation of an example of a function of error rate versus number of terms for a single document.

Further terms in the Fisher value order are added, one at a time, to the estimation process, to add points to the plot of $N_k(d)$. Thus, a plot of the error rate versus term number function for any one particular document might appear as shown in FIG. 5. Typically, the document will be erroneously classified until some number m of terms are employed in the class estimation. Accordingly, an error rate of 1 is plotted, up to m terms, upon which the document is correctly classified and the error plot drops to 0. As further terms (in Fisher value order) are added to the class estimation, eventually an added term may be a noise term and may cause misclassification of the document, upon which the error jumps back to 1. Thereafter, further terms may cause fluctuations in the $N_k(d)$ function, between 0 and 1.

Figure 6:
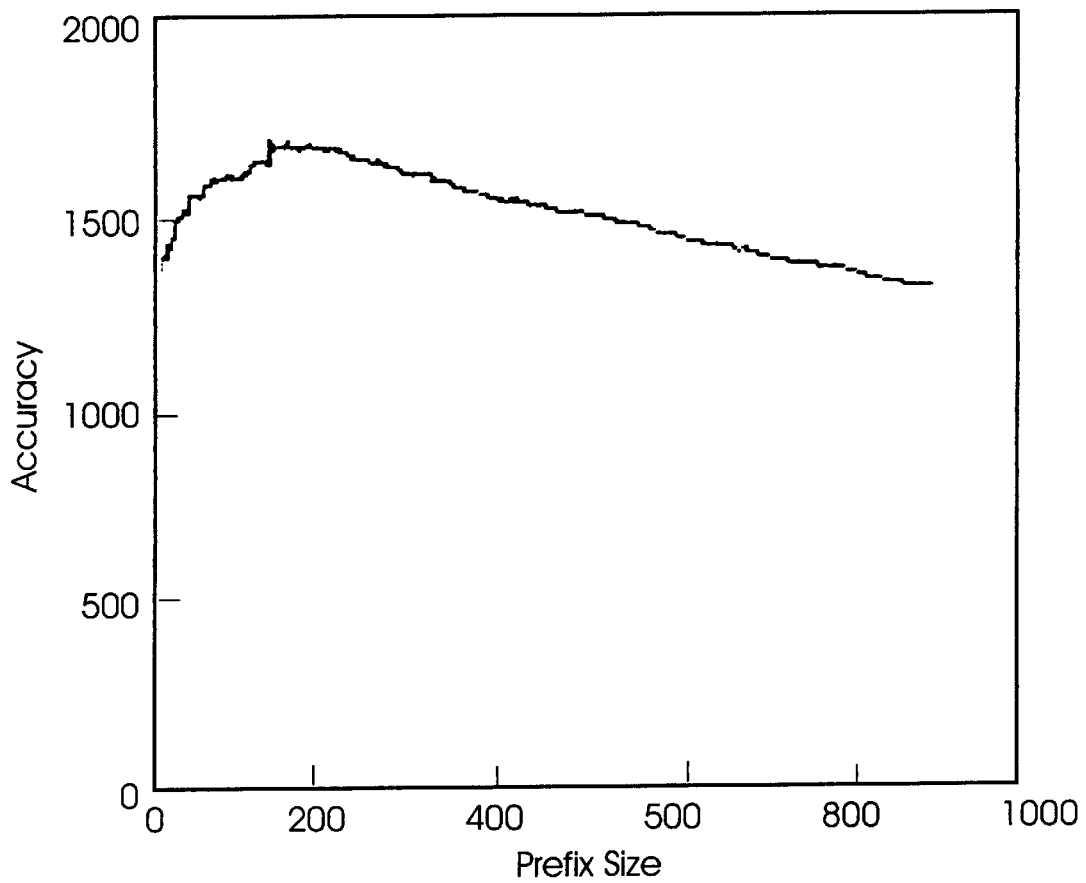
FIG. 6 shows a graphical representation of an example of a function of accuracy versus prefix size.

The process is repeated for each document in the model validation set 44, such that a function of the error rate versus number of terms is generated for each document. The functions for all of the documents in the model validation set are added together to provide an overall error rate versus term number function that appears, for example, as shown in FIG. 6, which is discussed in more detail below under the section titled "Feature Selection". In preferred embodiments, this aggregate error for all required number of feature terms is computed while scanning each validation document only once through the whole process.

The aggregate or average error will typically decrease steeply as terms are initially added to the feature set, reach a minimum, and then show an upward trend. Suppose k* is the smallest number of feature terms for which $N_k$ achieves (close to) its global minimum. Then these k* terms are picked as features for the intermediate node of the taxonomy under discussion. In this manner, a generally distinct set of feature terms are derived for classification at each intermediate node in the taxonomy. However, it will be understood that other means for determining a cut-off point in the order of discriminating powers may be employed, including but not limited to defining a preset number of terms as the cut-off point.

Extracting Document Signatures

Up to a point, the user can sift a query response based only on the topic paths. However, even the leaf classes are necessarily coarser than individual documents. Support is therefore needed to browse quickly through many documents without looking into the documents in detail. Most search engines attach a few lines from each document. Often these are the title and first few lines, or they are sentences with the most search terms. For many documents, better keyword extraction is needed. Moreover, it would be more advantageous for these signatures to be extracted relative to a node in the taxonomy.

Given this reference node c, one approach is to concatenate the training documents associated with c into a super document $d_c$ and then rank the terms $t\in d_c$ in decreasing order of the number of standard deviations that n(d,t) is away from $\theta(c,t)$. Here, the previously described simplistic document model may not suffice. As mentioned above, a term that has occurred once in a document is more likely to occur again. Since the Bernoulli model does not take this into account, frequent terms often remain surprising all along the taxonomy path.

Matters are improved by moving to another simple model, the binary model. First, consider a single test document d, and consider $t\in d$. If the observed fraction of training documents in class c containing term t at least once is $\theta(c,t)$, all $t\in d$ are sorted in increasing order of $\theta(c,t)$ and report the top few. Second, if there are l>1 test documents, then the fraction $\phi(t)$ is found that contains t at least once, and the terms are sorted in increasing order of $$\left| \frac{(\theta(c, t) - \phi(t))\sqrt{l}}{\sqrt{\theta(c, t)(1 - \theta(c, t))}} \right|$$

before presenting the results. Both, in fact, correspond to p-values computed using the normal approximation to the binomial distribution.

Data Structures and Pseudocode

Preferred embodiments of the current invention have the following distinctive features as an "industrial strength" topic analyzer:

Thousands of classes and millions of documents can be handled. The current limits in a prototype implementation are $2^{16}$ classes in the taxonomy, $2^{32}$ unique tokens and $2^{32}$ documents. A reasonable assumption is made that a simple pointer representation of the taxonomy together with a few words of data per class can be held in the computer memory at all times.

Training has near real-time response, as needed by crawling and indexing applications. Training makes a single pass over the corpus.

The prototype permits efficient incremental updates to a fixed taxonomy with new documents, deletion of documents, or moving documents from one class to another. With some more work, it is also possible to reorganize entire topic sub-trees.

System modules, according to preferred embodiments of the invention, include:

A mapping from textual terms to numeric term ID's (called TID's), which may be derived using a global counter, or a suitable hash function. A reverse mapping is also maintained.

Similar mappings between classes and numeric class ID's (called CID's).

A pointer-based tree data structure in memory for storing class-specific information, such as the number of training documents, etc.

A module for statistics.

A module for feature selection.

A module for applying the classifier on a test/new document.

The last three modules are described in detail next.

Statistics Collection

Figure 7:
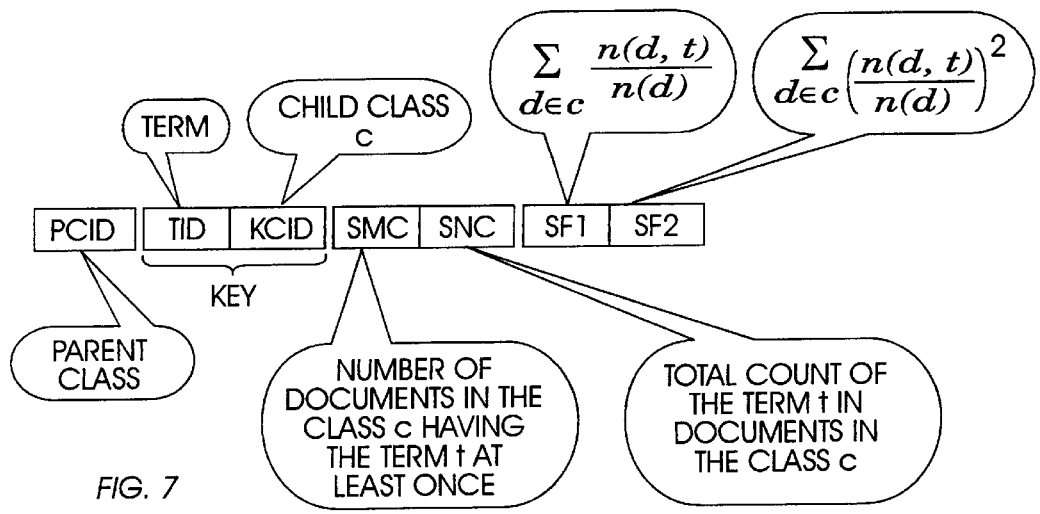
FIG. 7 shows a block diagram of the main statistics table maintained during training in one preferred embodiment.

The goal of this module is to collect term statistics from a training document and dispense with it as fast as possible. After simple stopword filtering and stemming while scanning, the document is converted to a sequence of 32-bit TID's (term ID's). The main table, for example, maintained on a computer readable disk, is a frequency table, such as that shown in FIG. 7. TID corresponds to a term that occurs in some document belonging to a class corresponding to KCID (child or kid class ID). The Parent Class ID (PCID) represents the parent of KCID (zero if KCID is the root). The class identifications CID's (KCID's and PCID's) are numbered from one onwards. The explicit presence of PCID is only to simplify the current disclosure. In an actual system, the class tree data structure is preferably always available to map from KCID's to PCID's, and, therefore, PCID does not need to be explicitly stored in the table.

In the statistics collection phase the main table is kept sorted on the keys TID and KCID. There is another unsorted table with the same row format. There are four other numeric fields per row. All of these four numbers are additive over documents, so for each document d and term t, a row is appended to the unsorted table, with SMC set to one, SNC set to the number of times t occurred in d, called n(d, t), SF1 set to $n(d,t)/\Sigma_\tau n(d,\tau)$, and SF2 set to $SF1^2$. SMC is used in the binary model, while SNC is needed in the Bernoulli model.

This approach trades off space for time, and the unsorted table grows rather quickly, but with a lot of duplicate keys. Depending on how much disk space exists, once in a while the system sorts and aggregates the unsorted table and then merges the result into the main sorted table. Various simple heuristics may be used to decide when to initiate a sort-merge. In one implementation, processing documents stops while the sort-merge is in progress. To meet tough real-time requirements, one can open a new frequency table and fork a thread, perhaps on another processor, to aggregate the last run while more documents continue to be accepted.

An indexed access approach could be used instead of the frequency table. As each document is scanned, the system would look up on the (TID, KCID) key and update SMC, SNC, SF1 and SF2. That would result in index lookups and random IO, potentially for every term in the training set. For large corpora, it is far more efficient to append statistics in a logged fashion as in the preferred embodiment. The frequency table is a temporary file and no direct indexed access to it is actually required later. Another benefit is compactness: this is the most space-intensive phase of training, and the storage overheads of indexed access are avoided, while explicit control of compaction is obtained. The space overhead of storing TID redundantly is moderate, as the rest of each row is already 18~bytes long.

Computing Fisher Indices

Figure 8:
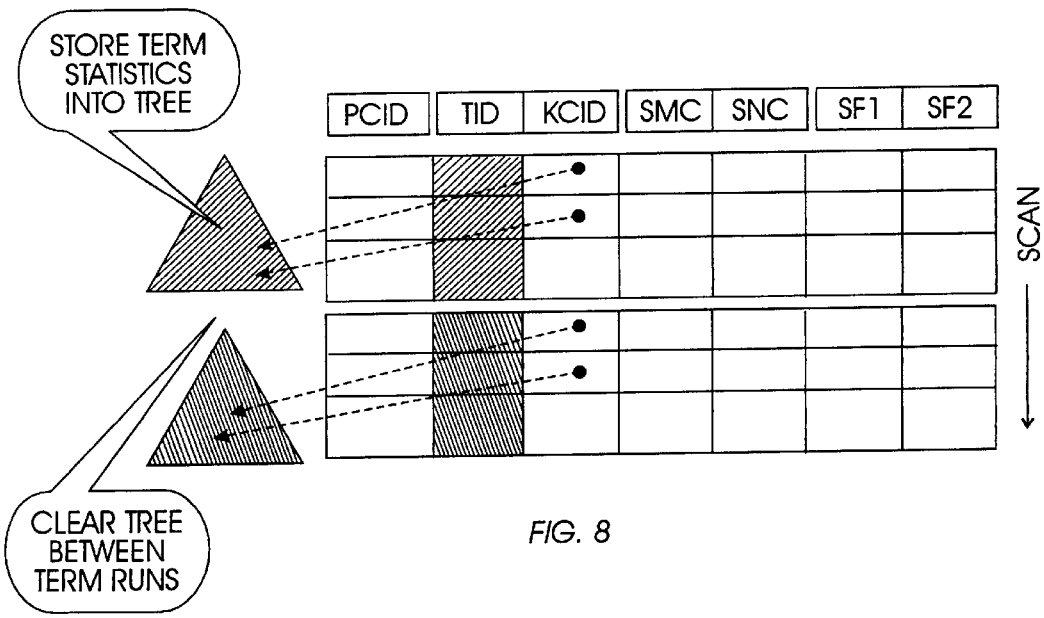
FIG. 8 shows an illustration of the data structures involved in the computation of discrimination power of each term during feature selection, in one preferred embodiment.

Before beginning feature selection, the frequency table is aggregated one last time, if needed to eliminate all duplicates. The frequency table is rewound and prepared for scanning. At this stage, all rows with the same TID are collected in a contiguous run going through all CID's where that TID occurred (see FIG. 7). Also, preparation takes place to output another file, called the fisher table. For the following description, a format shown in FIG. 8 is assumed. The format includes rows that are keyed by PCID and a floating point number FI (Fisher index), where for each fixed PCID the rows are sorted in decreasing order of FI. The last column is the TID (term ID) whose corresponding PCID and FI are the first and second columns.

Because TID is the primary key in the frequency table, as it is scanned, a sequence of runs are obtained, each run having a fixed TID. Associated with each topic node in memory, a few words of statistics are kept (derived from SMC, SNC, etc.). When a run is started for a given TID, these statistics are cleared. As the various KCID's are scanned for the given TID in the frequency table, the node corresponding to the KCID in the taxonomy is located, and these statistics are updated. In a large taxonomy, very few of the nodes will be updated during a run. If a node is updated, its parent will be updated as well. These statistics efficiently can, therefore, be reset after each run.

When the run for a given TID completes, exploring only the updated nodes, the Fisher index of that term is computed for every internal node (identified by its PCID) in the taxonomy as described in the section titled "Feature and Noise Terms." For each of these PCID's, a row is appended to the Fisher table. Next, the Fisher table is sorted on the key (PCID,FI). This collects all PCID's into contiguous segments, and for each PCID, orders terms by decreasing values of FI.

Consider now the case in which, for each internal topic c, the number k*(c) of features to pick is specified to TAPER directly. (The next section discusses how k*(c) is determined in one pass over the portion of the training documents set apart earlier for model pruning.) Given k*(c), the sorted Fisher table is scanned while copying the first k*(c) rows for the run corresponding to class c to an output table and discarding the remaining terms. This involves completely sequential IO.

Figure 10:
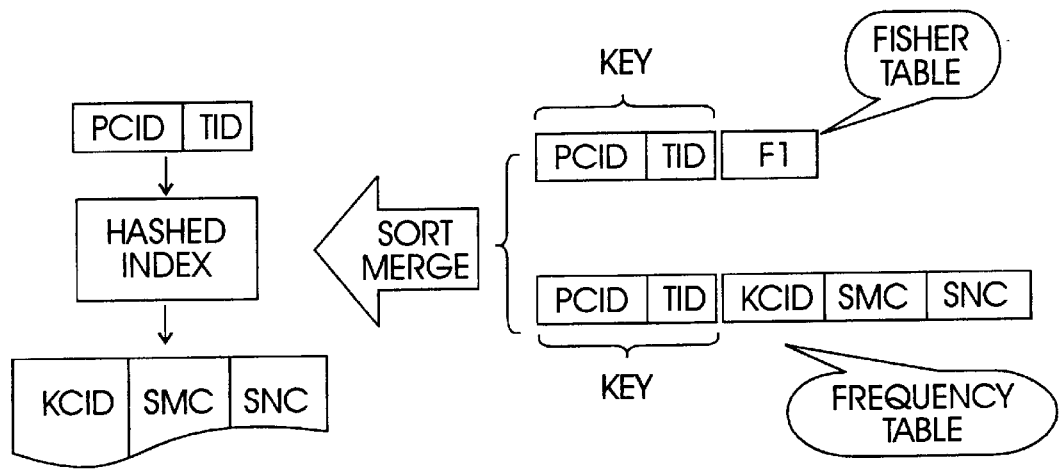
FIG. 10 shows a diagram showing how indexed statistics are computed after feature selection in one preferred embodiment.

As shown in FIG. 10, once feature selection is performed on the Fisher table, both the frequency and fisher table are sorted once again, this time with (PCID,TID) as the key. After these sorts, a merge is performed. Rows of the Fisher table are considered one by one. For each row, once the beginning of a key-matched row of the frequency table is found, the row is read as long as the key remains unchanged, constructing a vector in memory where each element has the form (KCID,SMC,SNC). This buffer is then written into a hash table on disk.

Feature Selection

Figure 9:
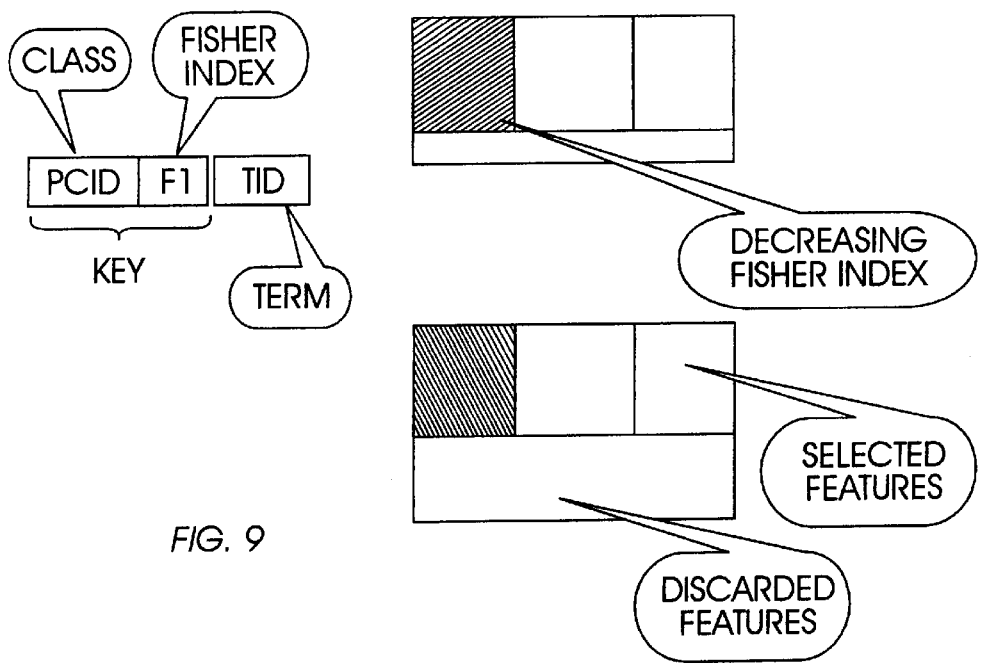
FIG. 9 shows an illustration of the organization of the table of terms and their discrimination powers in one preferred embodiment.

Given terms in decreasing Fisher index order for a fixed class c, it is desirable to find a good value for k*, the number of chosen features, as described in the section titled "Selecting a cut-off." In a preferred embodiment, this is done in only one pass over the validation documents in set V. FIG. 9 shows an illustration of the organization of the table of terms and their discrimination powers in one preferred embodiment. The table of terms is used in the feature selection process.

The technique used holds $N_k$ (the number of incorrectly classified documents as a function of k, the number of features used) in memory as against scanning the validation documents for different values of k. The following is pseudocode:

Naïve pseudocode:
For all or suitably many values of k
  Prepare models with only k features
  For each validation document d∈V,
    Determine $N_k(d)$ IO-efficient pseudocode:
Compute Fisher ordering and initialize $N_k=0$ for k=0,1,2, ...
For each validation document d∈V
  Compute $Pr[c'|c,d,F_0]$ for every child c' using priors only
  If a wrong class has highest Pr[c'| ... ] increment $N_0$
  For k=1,2, ...
    Check if the k-th feature occurs in d
    If so, find $Pr[c'|c,d,F_k]$ using $Pr[c'|c,d,F_{k-1}]$
    If a wrong class has highest Pr[c'| ... ] increment $N_k$ Even if $N_k$ is stored for every value of k, and the lexicon is of size 500,000 (a sample of 266,000 documents from Yahoo™ required 600,000), only 2 MB is needed. As each document d is scanned, $N_k(d)$ is aggregated into the $N_k$ array.

Earlier, it was discussed that indexed statistics could be computed, given the optimal number of k* of terms at each node. Here, the discussion is directed to how the k* is determined. The documents in the validation set are considered one by one. Each document d has a pre-assigned "correct" class label c*. The parent c of this class node is located in the topic tree. Recall that c has associated with it a ranked list of terms. These are intersected with the terms in d, and the common terms are sorted by the rank.

Now a sequence of progressively more detailed classifiers are constructed at c. The first one has only one feature, the top-ranked term in d. The second classifier has the top two features, etc. For each such classifier, it is checked whether d is correctly routed from c to c*. This gives a sequence of zero-one readings (i.e., zero if correct, and one if not) on a scale indexed by the rank of the last included term. The following is an example sequence for a particular document:

0–29 1 (classifiers indexed 0–29 did not place d in c*)
  29–500 0 (classifiers that used terms ranked 0 through k, for k=29, 30, ... 500 did place d in c*)
  500–550 1 (classifiers that included even more terms went wrong again, because they included noise)

Attached with each internal node, such as c above, is a file in which such sequences are appended for each validation document d. Once processing of (c, c*) is complete, processing continues up the tree, etc., until the processing of d is completely finished. These sequence files are then sorted on the index and a running sum is computed to generate the error rate curve as illustrated in FIG. 6.

Updates to the Database

For a batch job, the large frequency and fisher tables can now be deleted, leaving the relatively smaller indexed topic statistics and the much smaller term-to-TID maps. If the system is used to determine where new documents will be added to classes, it is necessary to preserve the frequency table. It continues to be used in the same way as before: rows are appended and occasionally it is compacted to aggregate duplicate keys. Running feature selection integrates the new data into the indexed statistics.

Like running statistics generation for a relational server, feature selection is not an interactive operation. For example, on a database with 2000 classes, with an average of 150 documents per class, and an average of 100 terms per document, it may take a couple of hours. So feature selection is invoked only when there is reason to believe that the refreshed statistics will improve classification. In further preferred embodiments, such times to perform feature selection is automatically determined, for example, based on the occurrence of one or more predetermined events.

Another issue is deletion of documents and moving of documents from one class to another (perhaps because classification was poor or erroneous for those documents). Since feature selection is always preceded by a frequency table aggregation, negative "correction" entries may be placed in it. That is, a frequency table row is produced, corresponding to each term in the deleted document, and SMC, SNC, SF1 and SF2 are negated for the class(es) from which the document is being deleted. Here, it cannot be ensured that the document was originally included in the aggregate, but that can be done by preserving ID's for training documents.

A more difficult issue is the reorganization of the taxonomy itself. Notice that in TAPER, a parent class inherits, in an additive fashion, the statistics of its children, since each training document generates rows for each topic node from the assigned topic up to the root. The preferred means of reorganization therefore involves reassigning some CID's and writing out a new frequency table with some negative "correction" entries.

For example, consider detaching a subtree under node $c_1$ and attaching it elsewhere under node $c_2$. Statistics at or above the least common ancestor $c_l$ of $c_1$ and $c_2$ remain unchanged. Negative (respectively, positive) rows are appended to the frequency table corresponding to all classes on the path between $c_l$ inclusive and $c_1$ (respectively, $c_2$) exclusive. Finally, the parent and child links have to be modified in the taxonomy tree.

Classification

The rationale for the data organization described above is now explained by a description of the procedure of classifying a new or test document. When analyzing a new or test document, the taxonomy and associated pre-computed statistics are first loaded, and then the document is submitted to the system in the form of a map from terms to frequencies. In the present model, the probability that the document is generated by the root topic is 1, by definition, and decreases down any path in the taxonomy. Accordingly, the user also specifies a probability cut-off for topics reported back as close matches.

Consider the document d at some internal node $c_0$ with children $c_1, c_2, \ldots$. The system first intersects d with the feature set at $c_0$, then, for each retained term $t \in d \cap F(c_0)$, and then the system looks up the model parameters for subtopics $c_1, c_2$, etc. It is thus best for both space and IO efficiency to index the statistics by $(c_0, t)$ and include in the record a vector of statistics for each child $c_i$, for $i=1,2,\ldots$, of node $c_0$. The obvious pseudocode has to be slightly modified to reflect this optimization (i.e., $p_c$ denotes log probabilities).

Naïve index lookup:

For each child $c_i$ of $c_0$, $i=1,2,\ldots$
   Initialize $p_{c_i}$ to 0
   For each term $t \in d \cap F(c_0)$
     Lookup statistics for term t for class $c_i$
     Update $p_{c_i}$ Normalize $\sum_i e^{p_{c_i}}$ to 1 add $p_{c_0}$ to each $p_{c_i}$.

Optimized index lookup:

Initialize all $p_{c_i}$ to 0
For each term $t \in d \cap F(c_0)$
   Skip if key $(c_0, t)$ is not in index
   Otherwise, retrieve record for $(c_0, t)$
   For each $c_i$ that appears in the record
     Update $p_{c_i}$
Normalize etc.

Caching and Batch Classification

Two additional optimizations may be needed in the above technique to rapidly compute class estimates for test/new documents. First, observe that in practice, most terms in a document will not be found in $F(c_0)$. It can be wasteful to frequently look up the index on disk only to discard terms. Since few terms are found useful, it is relatively acceptable to look up these statistics on disk. Thus, a fast cache of feature TID's, even without any attached statistics, just to check if a TID is a feature or not, greatly increases speed.

Second, given not one, but several documents to classify, it is desirable to amortize lookup of common terms by using a B-Tree access approach on the statistics (rather than a hash table), pre-sorting the TID's and making indexed scans on the statistics table. It is to be understood that any such locality-based performance optimizations and reordering of accesses to disk data are obvious to one trained in the art.

Incomplete Classification

With some documents, it may not be possible to narrow down the topic to a leaf node of the taxonomy. For example, there may be strong elements of both "Art:Painting" and "Arts:Photography" in a document, so that the best classification should be just "Arts." Various schemes may be proposed for dealing with such situations. In a preferred embodiment, the system can trade off between the benefit of narrowing down the topic against the cost of doing so with low confidence.

To illustrate this, it will suffice to consider the case of a three-node taxonomy with the root $c_0$ having two children $c_1, c_2$, where the goal, for a given document d, is to decide whether to stop at $c_0$, or to pick between $c_1$ and $c_2$. Intuitively, it is pointless to make the finer distinction if it is incorrect too often. This can be quantified in a variety of ways. Suppose the classifier picks $c_1$, the fraction of training documents in that class is $\pi_1$, and somehow it is known that the classifier is correct in this case with probability $p_1$. One possible estimate is $\Pr[d \in c_1 | d \in c_0]$. This can also be combined in various ways with the fraction of correct classifications over a cross-validation set. Then the "expected" factor by which the scope is narrowed down is $$\frac{p_1}{\pi_1} + (1 - p_1).$$

If this quantity is smaller than 1, the system stops at $c_0$ in a preferred embodiment. It is to be understood that any other such test of confidence, with the purpose of stopping the classifier prematurely, is within the spirit of the present invention.

Performance (Speed and Accuracy) Example

We used three data sets for evaluation: the Reuters newswire widely used in the IR community, a portion from the U.S. Patent database, and a sample from Yahoo™.

The experimental computers were between 133 and 266 MHz, with 128–256 MB of memory. Once a document is in memory, typical training time is 140ìs and typical testing time was 30ìs. Training and testing on Reuters takes 20 minutes overall. The Yahoo™ sample, with 2118 classes and 266,000 documents, takes 19 hours to train. Bernoulli was found to be superior to binary for all our experiments.

The Patent data set had three intermediate nodes below the root and twelve leaf nodes. A few hundred terms out of the lexicon of about 30,000 terms were sufficient to minimize error; the overall accuracy to the leaves was 66% (i.e., 66% patents were correctly classified) and the accuracy at the root node was 75%. For Reuters, the accuracy was 87%, as against the earlier best known technique's accuracy of 81% by Apte et al.

The best features in the patent taxonomy for the root and its three children are listed in Table 1 below. Observe how distinct the sets are.

TABLE 1

Patent: signal, modulate, motor, receive, antenna, telephone, transmit, frequency, demodulate, current, voltage, data, . . .

| Communication: antenna, telephone, modulator, demodulator, signal, . . . | Electricity: motor, heat, voltage, transistor, output, circuit, . . . | Electronics: amplifier, oscillator, input, output, frequency, transistor, . . . |
|---|---|---|

The feature selection technique is applied to find salient differences between various interesting sets of documents. One application is to find descriptions for clusters in unsupervised document clustering. For example, the query mouse provides hundreds of responses from the U.S. patent database. Clustering the responses and applying TAPER with the clusters treated as classes yields the automatically generated cluster descriptions shown in Table 2 below.

TABLE 2

Tissue, thymus, transplanted, hematopoietic, treatment, organ, trypsin, . . .
Computer, keyboard, hand, edge, top, location, keys, support, cleaning, . . .
Point, select, environment, object, display, correspondence, image, . . .

These "cluster digests" clearly identify different contexts of the occurrence of "mouse" and help the user easily refine the query.

As yet another example application of the TAPER system, the patent portfolios of two assignees, or one assignee over two different intervals, were compared. For example, a comparison between "Sun Microsystems" and "Silicon Graphics" gave the result shown in Table 3 below.

TABLE 3

| Sun Microsystems | Silicon Graphics |
|---|---|
| General purpose programmable digital computer systems Electrical computers and data processing system Integrated circuit, processor | Information processing system organization Data representation, computer graphics Surface detail, texture Adjusting resolution or level of detail |

Note how the commonality between the assignees ("UNIX workstations") is filtered out and the difference brought out.

An even more interesting example is comparing Intel patents in 1993–94 with those in 1994–95. TAPER detects a new line of research and patenting in the latter year, as shown in Table 4 below.

TABLE 4

| Intel, 1993–94 | Intel, 1994–95 |
|---|---|
| General purpose programmable digital computer systems Chip, fabrication, counter, input | Interactive television bandwidth reduction system Involving difference transmission Field or frame difference |

Note that it is possible to get coherent phrases in this case because the patent meta-data stores these as effectively single terms.

In a typical application, a taxonomy will be initially designed by hand, and training documents obtained. Once training is completed, the accuracy of the system can be estimated by comparing the class output of the classifier 50 with the known classifications of the testing documents 34 (FIG. 3). If the accuracy is inadequate, a further training procedure, using a different collection of documents, or a reorganization of the taxonomy, may be carried out to retrain the system. Once satisfactory accuracy is achieved, the system may be used for a number of purposes such as search, filtering, and indexing as described above.

Broadly, the current invention can be distinguished from prior work in its use of a context dependent statistics, and its emphasis on scalability and speed in dealing with corpora ranging into tens to hundreds of gigabytes, the use of efficient disk data structures, and efficient update mechanisms. The present invention has focused on techniques that have good statistical foundation while remaining within almost linear time and one pass over the corpus, even when doing feature selection simultaneously for many nodes in a large topic taxonomy.

Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. A process for classifying new documents containing features under nodes defining a multilevel taxonomy, based on features derived from a training set of documents that have been classified under respective nodes of the taxonomy, the process comprising:

associating a respective set of features with each one of said plurality of nodes, each given set of features comprising a plurality of features that are in at least one training document classified under the associated node; and classifying each new document under at least one node, based on the set of features associated with said at least one node, further comprising:

determining a discrimination value for each term in at least one training document which is classified under each one of a plurality of the nodes of the taxonomy, wherein the discrimination value comprises a Fisher value based on the equation:

$$\text{Fisher}(t) = \frac{\sum\limits_{c_1, c_2} (\mu(c_1, t) - \mu(c_2, t))^2}{\sum\limits_{c} \frac{1}{|c|} \sum\limits_{d \in c} (n(t, d, c) - \mu(c, t))^2}$$

where t represents a term, d represents a document, c represents a class, $$\mu(c, t) = \frac{1}{|c|} \sum_{d \in c} x(d, t),$$

and $x(d, t)$ = an occurrence rate of $t$ in $d$;

determining a minimum discrimination value for each of said plurality of nodes;

wherein the features in each given set of features have discrimination values equal to or above the minimum discrimination value determined for the node associated with the given set of features.

2. A process as recited in claim 1, wherein said step of selecting a set of features comprises selecting features that are in a plurality of training documents classified under the associated node and that have discrimination values equal to or above the minimum discrimination value.

3. A process as recited in claim 1, wherein said step of classifying comprises:

scanning each new document to determine the features in the document; and defining, for each of said plurality of said plurality of nodes and for each new document, the probability that the new document is classified under the node, based on the set of features associated with the node and the features in the document.

4. A process as recited in claim 3, wherein said step of defining the probability comprises the step of applying a statistical model to define said probability that features in each given new document would occur at the frequency at which they do occur in the given new document.

5. A process as recited in claim 4, wherein said statistical model comprises a Bernoulli model.

6. A process as recited in claim 4, wherein said statistical model comprises a Poisson model.

7. A process as recited in claim 4, wherein said step of classifying further comprises the step of assigning each given new document to at least one respective node in at least one level of the taxonomy, wherein the at least one node to which each given new document is assigned is the node for which the defined probability is above a predefined threshold among all of the nodes at the same level in the taxonomy.

8. A process as recited in claim 7, wherein the at least one node to which each given new document is assigned is the node for which the defined probability is maximum among all of the nodes at the same level in the taxonomy.

9. A process as recited in claim 8, wherein said step of assigning each given new document to at least one respective node in at least one level of the taxonomy comprises the step of assigning each given new document to at least one respective node in each of a plurality of levels of the taxonomy.

10. A process as recited in claim 1, wherein said step of selecting a set of features comprises selecting features that are in all of training documents classified under the associated node and that have discrimination values equal to or above the minimum discrimination value.

11. A process as recited in claim 1, wherein said step of determining a discrimination value comprises determining a discrimination value for each feature in a plurality of training documents which are classified under each one of a plurality of the nodes of the taxonomy.

12. A process as recited in claim 1, wherein said step of determining a discrimination value comprises determining a discrimination value for each feature in all of the training documents which are classified under each one of a plurality of the nodes of the taxonomy.

13. A process as recited in claim 1, wherein said step of associating a respective set of features with each node comprises the step of determining the number of features to associate with each respective node.

14. A process as recited in claim 13, wherein said step of associating a respective set of features with each given node comprises the steps of:
   ranking, by discrimination power, each of a plurality of features that are in at least one training document classified under the each given node;
   providing an optimal number N of features for each given node; and
   defining the set of features associated with a given node as the features ranked highest to the Nth highest in said step of ranking.

15. A process as recited in claim 14, wherein said step of providing an optimal number N comprises the step of determining the number N for each given node based on a test set of documents.

16. A process as recited in claim 1, further comprising the step of displaying, for given node of a plurality of nodes of the taxonomy, a signature comprising at least one feature associated with the documents classified under the given node.

17. A process as recited in claim 16, wherein said signature for each given node comprises a plurality of features associated with the documents classified under the given node.

18. A process as recited in claim 16, wherein said signature for each given node comprises a plurality of features that occur in the documents classified under the given node, but which are determined to have a relatively low frequency of occurrence among documents under the given node.

19. A classifier system for classifying new documents containing terms under nodes defining a multilevel taxonomy, based on feature terms derived from a training set of documents which are classified under respective nodes on the taxonomy, the system comprising:
   means for determining discrimination value for each term in at least one training document which is classified under each one of a plurality of the nodes of the taxonomy, wherein the discrimination value comprises a Fisher value based on the equation:

$$\text{Fisher}(t) = \frac{\sum_{c1,c2}(\mu(c_1,t)-\mu(c_2,t))^2}{\sum_{c}\frac{1}{|c|}\sum_{d\in c}(x(t,d,c)-\mu(c,t))^2}$$

where t represents a term, d represents a document, c represents a class, $$\mu(c,t) = \frac{1}{|c|}\sum_{d\in c}x(d,t),$$

and $x(d, t) =$ an occurrence rate of $t$ in $d$;

means for determining a minimum discrimination value for each of said plurality of nodes;
   means for selecting a set of feature terms associated with each one of said plurality of nodes, said feature terms comprising terms that are in at least one training document classified under the associated node and that have discrimination values equal to or above the minimum discrimination value;
   means for classifying each new document under at least one node, based on the feature terms associated with said at least one node.

20. A system as recited in claim 19, wherein said means for classifying comprises:
   means for scanning each new document to determine the terms in the document; and
   means for defining, for each of said plurality of said plurality of nodes and for each new document, the probability that the new document is classified under the node, based on the feature terms associated with the node and the terms in the document.

21. A system as recited in claim 20, wherein said means for defining the probability comprises means for applying a Bernoulli model to define said probability for each of said plurality of nodes.

22. A system as recited in claim 19, wherein said means for selecting a set of feature terms comprises means for selecting terms that are in a plurality of training documents classified under the associated node and that have discrimination values equal to or above the minimum discrimination value.

23. A system as recited in claim 19, wherein said means for selecting a set of feature terms comprises means for selecting terms that are in all of training documents classified under the associated node and that have discrimination values equal to or above the minimum discrimination value.

24. A system as recited in claim 19, wherein said means for determining a discrimination value comprises means for determining a discrimination value for each term in a plurality of training documents which are classified under each one of a plurality of the nodes of the taxonomy.

25. A system as recited in claim 19, wherein said means for determining a discrimination value comprises means for determining a discrimination value for each term in all of the training documents which are classified under each one of a plurality of the nodes of the taxonomy.

26. An article of manufacture comprising a computer program carrier readable by a computer and embodying one or more instructions executable by the computer to perform a process for classifying new documents containing terms under nodes defining a multilevel taxonomy, based on feature terms derived from a training set of documents which are classified under respective nodes of the taxonomy, the process comprising:

determining a discrimination value for each term in at least one training document which is classified under each one of a plurality of the nodes of the taxonomy, wherein the discrimination value comprises a Fisher value based on the equation:

$$\text{Fisher}(t) = \frac{\sum_{c1,c2} (\mu(c_1, t) - \mu(c_2, t))^2}{\sum_c \frac{1}{|c|} \sum_{d \in c} (x(t, d, c) - \mu(c, t))^2}$$

where t represents a term, d represents a document, c represents a class, $$\mu(c, t) = \frac{1}{|c|} \sum_{d \in c} x(d, t),$$

and $x(d, t) = $ an occurrence rate of $t$ in $d$;

determining a minimum discrimination value for each of said plurality of nodes;

selecting a set of feature terms associated with each one of said plurality of nodes; said feature terms comprising terms that are in at least one training document classified under the associated node and that have discrimination values equal to or above the minimum discrimination value; and classifying each new document under at least one node, based on the feature terms associated with said at least one node.

27. An article as recited in claim 26, wherein said step of classifying comprises:

scanning each new document to determine the terms in the document; and defining, for each of said plurality of said plurality of nodes and for each new document, the probability that the new document is classified under the node, based on the feature terms associated with the node and the terms in the document.

28. An article as recited in claim 27, wherein said step of defining the probability comprises the step of applying a Bernoulli model to define said probability for each of said plurality of nodes.

29. An article as recited in claim 26, wherein said step of selecting a set of feature terms comprises selecting terms that are in a plurality of training documents classified under the associated node and that have discrimination values equal to or above the minimum discrimination value.

30. An article as recited in claim 26, wherein said step of selecting a set of feature terms comprises selecting terms that are in all of training documents classified under the associated node and that have discrimination values equal to or above the minimum discrimination value.

31. An article as recited in claim 26, wherein said step of determining a discrimination value comprises determining a discrimination value for each term in a plurality of training documents which are classified under each one of a plurality of the nodes of the taxonomy.

32. An article as recited in claim 26, wherein said step of determining a discrimination value comprises determining a discrimination value for each term in all of the training documents which are classified under each one of a plurality of the nodes of the taxonomy.

* * * * *